US012560294B2

(12) United States Patent
Kato

(10) Patent No.: US 12,560,294 B2
(45) Date of Patent: Feb. 24, 2026

(54) VEHICLE LAMP HAVING LIGHT SOURCE, LENS HAVING FIRST AND SECOND PORTIONS, AND REFLECTOR

(71) Applicant: NICHIA CORPORATION, Anan (JP)

(72) Inventor: Masaru Kato, Sagamihara (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 19/053,058

(22) Filed: Feb. 13, 2025

(65) Prior Publication Data

US 2025/0264199 A1 Aug. 21, 2025

(30) Foreign Application Priority Data

Feb. 16, 2024 (JP) ................................ 2024-021648

(51) Int. Cl.
*F21S 41/265* (2018.01)
*F21S 41/151* (2018.01)
*F21S 41/32* (2018.01)

(52) U.S. Cl.
CPC .......... *F21S 41/265* (2018.01); *F21S 41/151* (2018.01); *F21S 41/321* (2018.01)

(58) Field of Classification Search
CPC ...... F21S 41/151; F21S 41/265; F21S 41/148; F21S 41/663; F21V 5/08; F21V 13/04; F21Y 2115/10
See application file for complete search history.

(56) References Cited

U.S. PATENT DOCUMENTS

| | | | |
|---|---|---|---|
| 2019/0093845 A1 | 3/2019 | Miyairi | |
| 2019/0093873 A1 | 3/2019 | Nishi | |
| 2019/0120453 A1 | 4/2019 | Okubo | |
| 2022/0034472 A1 | 2/2022 | Iwasaki et al. | |

FOREIGN PATENT DOCUMENTS

| | | | | |
|---|---|---|---|---|
| JP | 2016-085847 A | | 5/2016 | |
| JP | 2017-195116 A | | 10/2017 | |
| JP | 2018-022584 A | | 2/2018 | |
| JP | 2019-061752 A | | 4/2019 | |
| JP | 2019-061905 A | | 4/2019 | |
| JP | 2019-133842 A | | 8/2019 | |
| KR | 20150051672 A | * | 5/2015 | ............ F21S 41/265 |
| WO | WO-2020/067213 A1 | | 4/2020 | |
| WO | WO-2023/145200 A1 | | 8/2023 | |

* cited by examiner

*Primary Examiner* — Robert J May
(74) *Attorney, Agent, or Firm* — Foley & Lardner LLP

(57) ABSTRACT

A vehicle lamp includes: a light source including a plurality of light-emitting parts arranged in a first direction; a first lens separated from the light source and configured to transmit light emitted from the light source; and a reflector disposed between the first lens and the light source, located below the plurality of light-emitting parts in a second direction orthogonal to the first direction, and having a reflective surface that reflects the light emitted from the light source. The first lens includes a first portion having a positive refractive power in each of the first direction and the second direction, and a second portion having a refractive power in the second direction that is smaller than a refractive power in the first direction. The refractive power of the first portion in the second direction is greater than the refractive power of the second portion in the second direction.

13 Claims, 20 Drawing Sheets

VEHICLE LAMP HAVING LIGHT SOURCE, LENS HAVING FIRST AND SECOND PORTIONS, AND REFLECTOR

CROSS-REFERENCE TO RELATED APPLICATIONS

This application is based on and claims priority to Japanese Patent Application No. 2024-021648, filed on Feb. 16, 2024, the entire contents of which are incorporated herein by reference.

TECHNICAL FIELD

The present disclosure relates to a vehicle lamp.

BACKGROUND

Vehicle lamps including light-emitting elements such as light-emitting diodes (LEDs) are known. For example, Japanese Patent Publication No. 2017-195116 describes a vehicle lamp including a semiconductor light source unit including a light-emitting chip, a lens disposed in front of the light source unit, and a reflector disposed between the lens and light source unit and on the lower side of the light-emitting chip in the vertical direction.

In vehicle lamps, the lower limit or the upper limit of the amount of light required for each irradiation region is determined by standards, and thus it is necessary to control a light distribution angle.

SUMMARY

An object of one embodiment of the present disclosure is to provide a vehicle lamp capable of emitting light having a large light distribution angle and satisfying regulations regarding irradiation regions of vehicle lamps.

A vehicle lamp according to one embodiment of the present disclosure includes: a light source including a plurality of light-emitting parts arranged in a first direction; a first lens separated from the light source and configured to transmit light emitted from the light source; and a reflector disposed between the first lens and the light source, located below the plurality of light-emitting parts in a second direction orthogonal to the first direction, and having a reflective surface that reflects the light emitted from the light source. The first lens includes a first portion having a positive refractive power in each of the first direction and the second direction, and a second portion having a refractive power in the second direction that is smaller than a refractive power in the first direction. The refractive power of the first portion in the second direction is greater than the refractive power of the second portion in the second direction.

DETAILED DESCRIPTION

Figure 1:
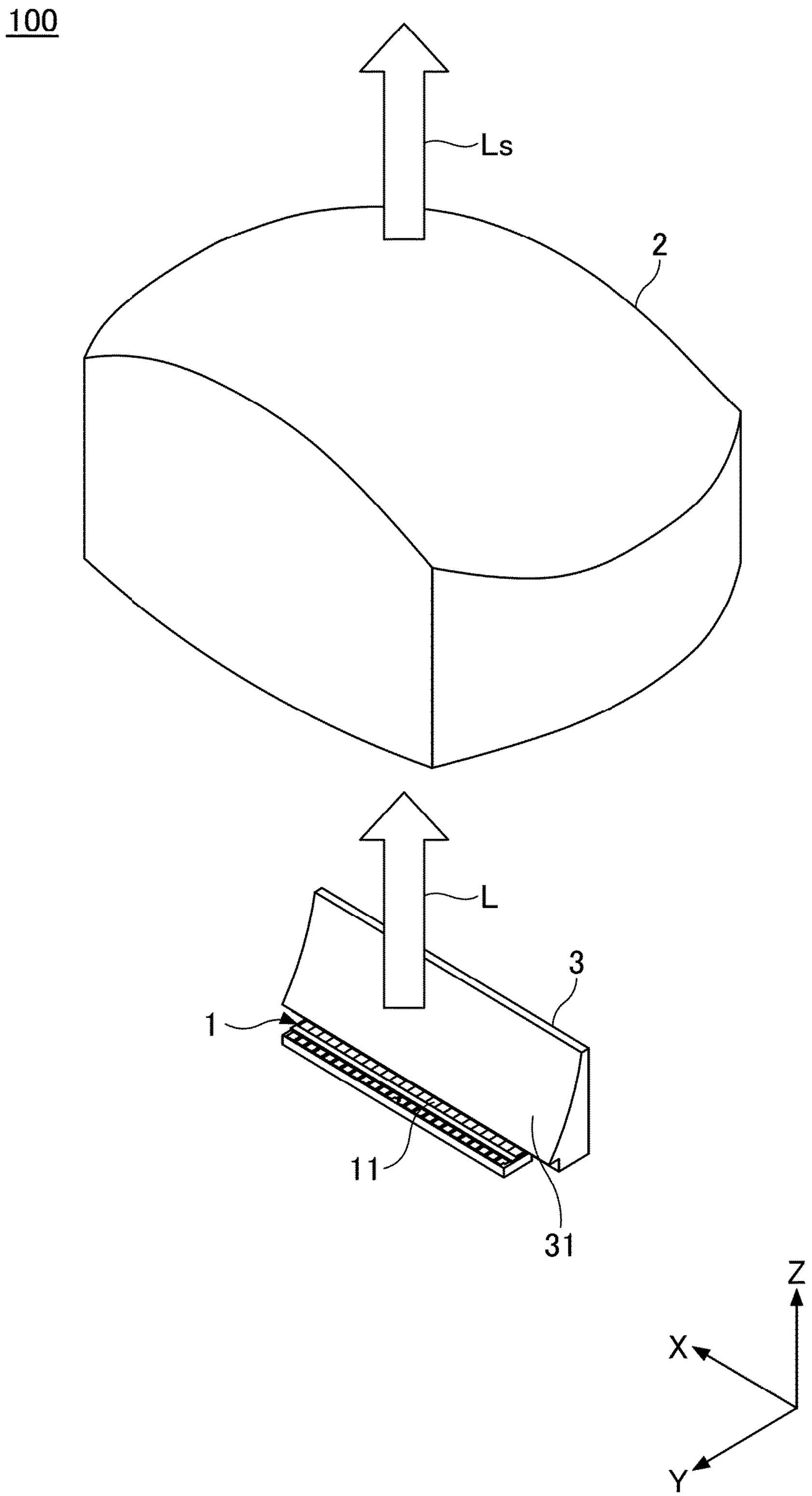
FIG. 1 is a schematic perspective view illustrating an overall configuration of a vehicle lamp according to a first embodiment.

Vehicle lamps according to embodiments of the present disclosure will be described with reference to the accompanying drawings. The following embodiments exemplify the vehicle lamps to give a concrete form to the technical ideas of the present disclosure, but the present invention is not limited to the described embodiments. In addition, unless otherwise specified, the dimensions, materials, shapes, relative arrangements, and the like of components described in the embodiments are not intended to limit the scope of the present disclosure thereto, but are described as examples.

The sizes, positional relationships, and the like of members illustrated in the drawings may be exaggerated for clearer illustration. Further, in the following description, the same names and reference numerals denote the same or similar members, and a detailed description thereof will be omitted as appropriate. An end view illustrating only a cut surface may be used as a cross-sectional view.

In the drawings, to indicate directions, an orthogonal coordinate system having an X-axis, a Y-axis, and a Z-axis is used. The X-axis, the Y-axis, and the Z-axis are orthogonal to one another. An X direction along the X-axis corresponds to a first direction. A Y direction along the Y-axis corresponds to a second direction. A Z direction along the Z axis corresponds to a third direction intersecting each of the first direction and the second direction. In the following, the X direction is referred to as a first direction X. The Y direction is referred to as a second direction Y. The Z direction is referred to as a third direction Z. A direction indicated by an arrow in the X direction is referred to as a lateral direction. A direction indicated by an arrow in the Y direction is referred to as an upward direction, and a direction opposite to the upward direction is referred to a downward direction. A direction indicated by an arrow in the Z direction is referred to as a forward direction, and a direction opposite to the forward direction is referred to a rearward direction. In examples in the present specification, the vehicle lamps according to the embodiments are configured to emit light in the forward direction.

In the present specification, the term “top view” refers to a view of an object as seen from above. The term “front view” refers to a view of an object as seen from the front side. The term “side view” refers to a view of an object as seen from the lateral side. In the present specification, each of the phrases “along the X-axis,” “along the Y-axis,” and “along the Z-axis” includes a case where an object is at an inclination within a range of ±20° with respect to the corresponding one of the axes.

Further, in the present specification and the claims, if there are multiple components and these components are to be distinguished from one another, the components may be distinguished by adding terms “first,” “second,” and the like before the names of the components. Further, objects to be distinguished may be different between the specification and the claims. Therefore, even if a component recited in the claims is denoted by the same reference numeral as that of a component described in the present specification, an object specified by the component recited in the claims is not necessarily identical with an object specified by the component described in the specification.

First Embodiment

Configuration of Vehicle Lamp According to First Embodiment (Overall Configuration)

Figure 2:
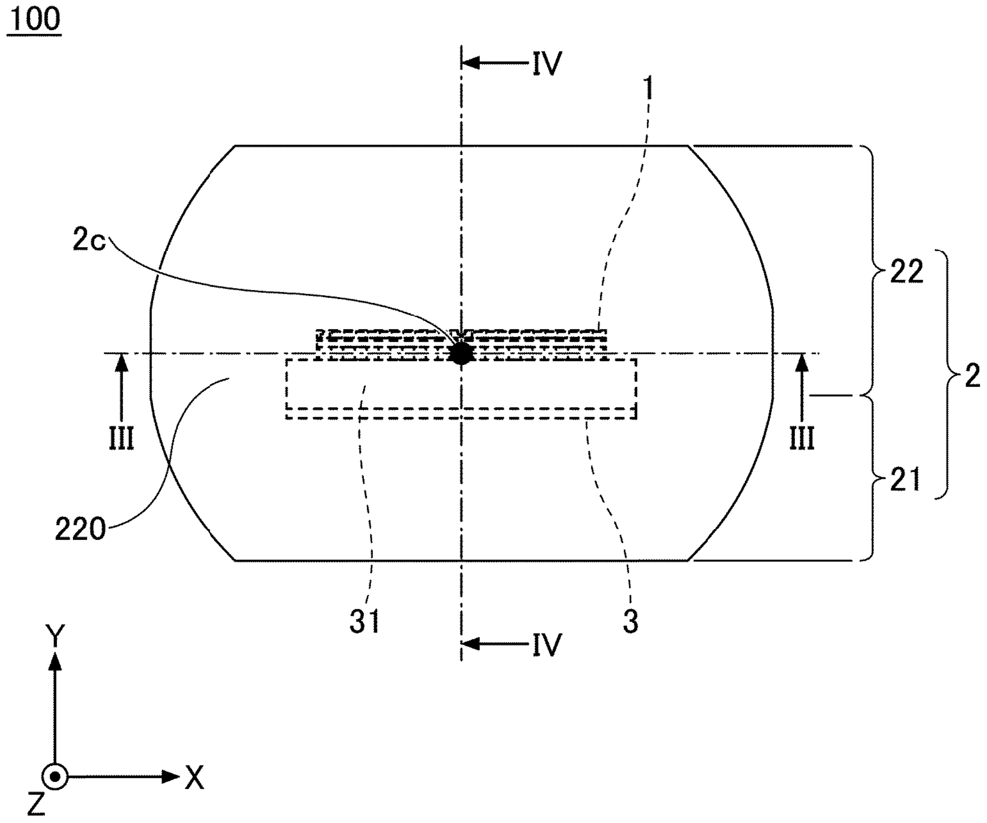
FIG. 2 is a schematic front view illustrating the overall configuration of the vehicle lamp according to the first embodiment.
Figure 3:
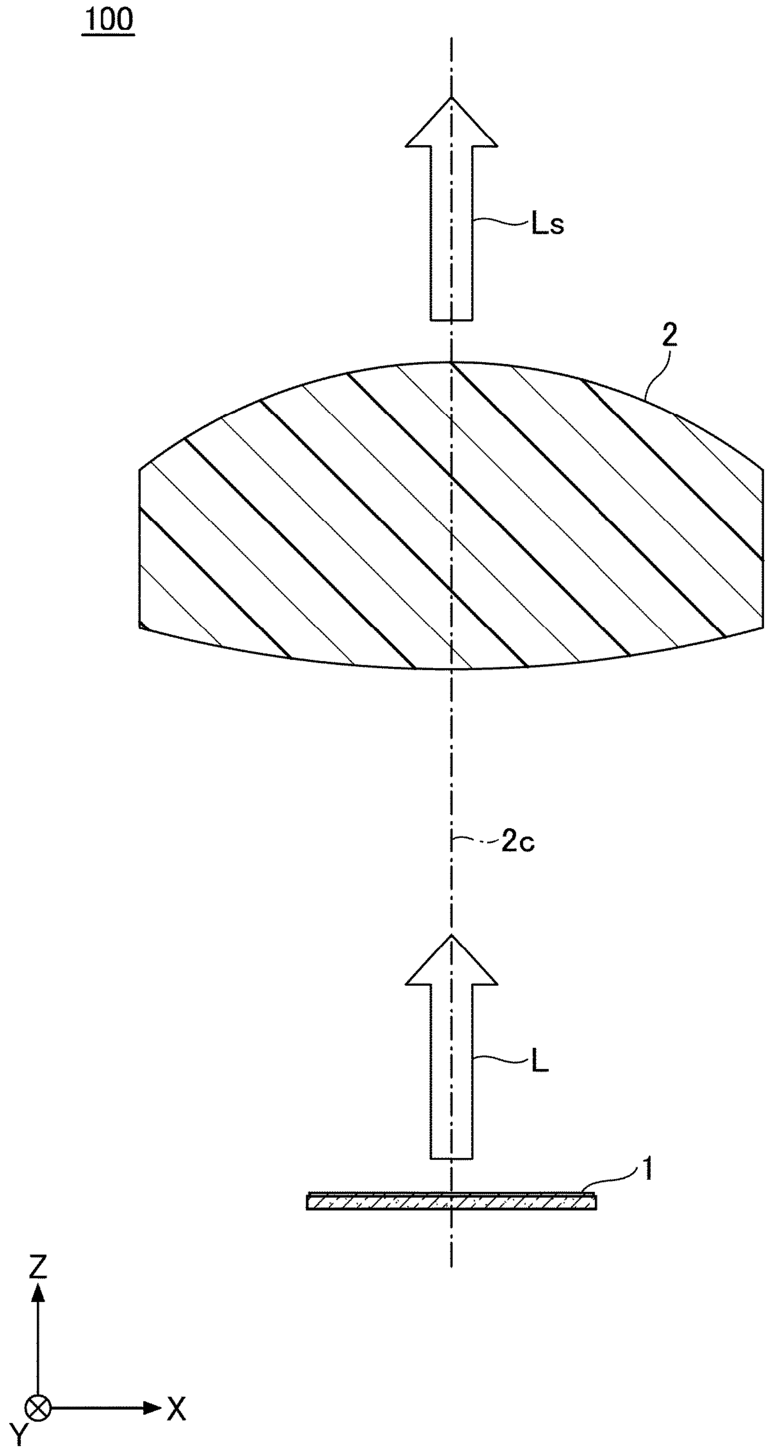
FIG. 3 is a schematic cross-sectional view taken through line III-III of FIG. 2.
Figure 4:
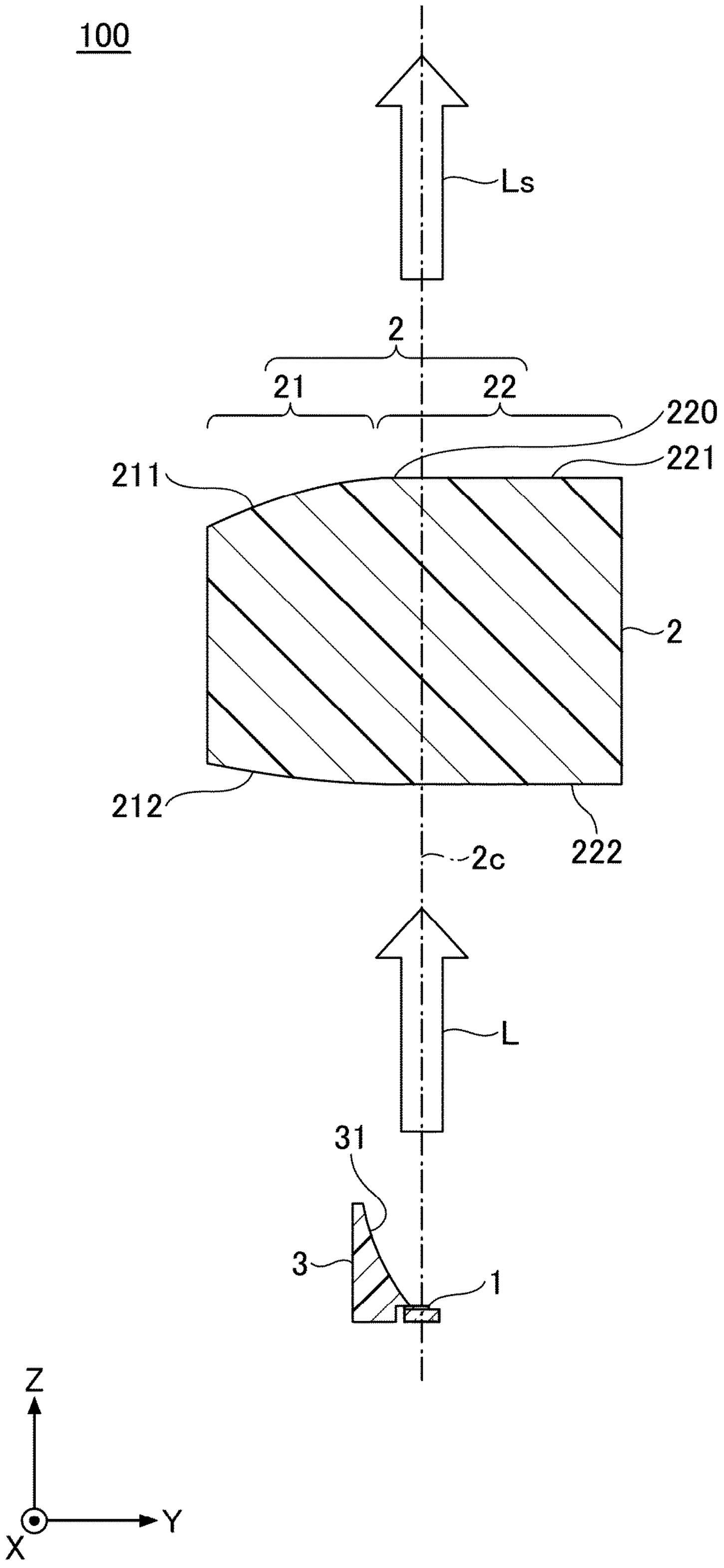
FIG. 4 is a schematic cross-sectional view taken through line IV-IV of FIG. 2.

An overall configuration of a vehicle lamp according to a first embodiment will be described with reference to FIG. 1 to FIG. 4. FIG. 1 is a schematic perspective view illustrating an example of an overall configuration of a vehicle lamp 100 according to the first embodiment. FIG. 2 is a schematic front view illustrating an example of the overall configuration of the vehicle lamp 100 according to the first embodiment. FIG. 3 is a schematic cross-sectional view taken through line III-III of FIG. 2. FIG. 4 is a schematic cross-sectional view taken through line IV-IV of FIG. 2. In the example illustrated in FIG. 1, FIG. 3, and FIG. 4, light emitted from a light source 1 is represented as light L indicated by a white arrow, and irradiation light emitted from the vehicle lamp 100 is represented as irradiation light Ls indicated by a white arrow.

The vehicle lamp 100 includes the light source 1 including a plurality of light-emitting parts 11 arranged in the first direction X, and a first lens 2 separated from the light source 1 and configured to transmit light emitted from the light source 1. The vehicle lamp 100 further includes a reflector 3 disposed between the first lens 2 and the light source 1, located below the plurality of light-emitting parts 11 in the second direction Y orthogonal to the first direction X, and having a reflective surface 31 that reflects the light L emitted from the light source 1. The first lens 2 includes a first portion 21 having a positive refractive power in the first direction X and the second direction Y, and a second portion 22 having a refractive power in the second direction Y that is smaller than a refractive power in the first direction X. The refractive power of the first portion 21 in the second direction Y is greater than the refractive power of the second portion 22 in the second direction Y.

The vehicle lamp 100 is a vehicle lamp that can emit light forward in a direction intersecting each of the first direction X and the second direction Y. The vehicle lamp 100 is a lamp such as a headlight mounted on a vehicle such as an automobile. In the example illustrated in FIG. 1 to FIG. 4, the vehicle lamp 100 can emit the irradiation light Ls forward through the first lens 2 by causing the light source 1 to emit the light L forward. The light source 1 emits the light L that is divergent light.

In the vehicle lamp 100, the refractive power of the second portion 22 in the second direction Y is smaller than the refractive power of the second portion 22 in the first direction X. Accordingly, in the vehicle lamp 100 in which divergent light is emitted from the light source 1, is incident on the first lens 2, and then exits as irradiation light Ls from the first lens 2, a portion of the irradiation light Ls exiting from the second portion 22, can be spread in the second direction Y. In the present embodiment, by causing the irradiation light Ls exiting from the second portion 22 to spread in the second direction Y, the light distribution angle in the third direction Z of the irradiation light Ls exiting from the first lens 2 can be increased. Thus, the vehicle lamp 100 capable of emitting light having a large light distribution angle and satisfying regulations and standards regarding irradiation regions of vehicle lamps can be provided. Examples of the regulations and standards regarding irradiation regions of vehicle lamps include Federal Motor Vehicle Safety Standards (FMVSS) 108 and Agreement Concerning The Adoption Of Uniform Technical Prescriptions For Wheeled Vehicles, Equipment And Parts Which Can Be Fitted And/Or Be Used On Wheeled Vehicles And The Conditions For Reciprocal Recognition Of Approvals Granted On The Basis Of These Prescriptions of United Nations Regulations (UNR) 149.

In the vehicle lamp 100, the first portion 21 has a positive refractive power in the first direction X and the second direction Y. Thus, irradiation light Ls exiting from the first portion 21, of the irradiation light Ls exiting from the first lens 2, can be suppressed from spreading in the first direction X and the second direction Y. Further, in the vehicle lamp 100, the refractive power of the second portion 22 in the first direction X is greater than the refractive power of the second portion 22 in the second direction Y. Thus, the irradiation light Ls exiting from the second portion 22, of the irradiation light Ls exiting from the first lens 2, can be spread less in the first direction X than in the second direction Y.

Because the irradiation light Ls exiting from the first portion 21 substantially does not spread in the first direction X and the second direction Y, and the irradiation light L exiting from the second portion 22 spreads less in the first direction X than in the second direction Y, the irradiation range of the irradiation light L in the first direction X can be limited. Therefore, in the vehicle lamp 100, the luminous intensity of the irradiation light Ls exiting from the first lens 2 can be increased. As described above, in the present embodiment, the vehicle lamp 100 capable of emitting light having a large light distribution angle in the second direction Y and high luminous intensity and satisfying the regulations and standards regarding irradiation regions of vehicle lamps can be provided.

The vehicle lamp 100 includes the first lens 2 including the first portion 21 and the second portion 22. Thus, as compared to when a first lens functioning as the first portion 21 and a first lens functioning as the second portion 22 are individually provided, the volume occupied by the first lens in the vehicle lamp can be reduced, and thus the size of the vehicle lamp can be reduced. In addition, because the number of parts can be reduced, the manufacturing tact time can be shortened, and the manufacturing cost can be reduced.

In the example illustrated in FIG. 2 and FIG. 4, in the vehicle lamp 100, the second portion 22 of the first lens 2 is located above the first portion 21 in the second direction Y. With this configuration, when the vehicle lamp 100 emits light having a high-beam distribution for irradiating a distant place, the light having the high-beam distribution can be transmitted through the second portion 22. As a result, even with a high-beam light distribution, the vehicle lamp 100 can cause the irradiation light Ls exiting from the second portion 22 to spread in the second direction Y. In addition, the vehicle lamp 100 can cause the irradiation light L exiting from the second portion 22 to spread less in the first direction X than in the second direction Y. Therefore, the vehicle lamp 100 can emit light having a high-beam distribution, a large light distribution angle in the second direction Y, and high luminous intensity and satisfying the regulations and standards regarding irradiation regions of vehicle lamps.

In the example illustrated in FIG. 3 and FIG. 4, the second portion 22 of the first lens 2 of the vehicle lamp 100 is a cylindrical body having a positive refractive power in the first direction X and having substantially no refractive power in the second direction Y. Because the second portion 22 substantially does not have a refractive power in the second direction Y, the irradiation light Ls exiting from the second portion 22, of the irradiation light Ls exiting from the first lens 2 after the light L that is the divergent light emitted from the light source 1 is transmitted through the first lens 2, can be caused to spread in the second direction Y. Accordingly, the light distribution angle in the second direction Y of the irradiation light Ls exiting from the first lens 2 can be increased. Thus, the vehicle lamp 100 can emit light having a large light distribution angle. In addition, because the second portion 22 has a positive refractive power in the first direction X, the irradiation light Ls exiting from the second portion 22, of the irradiation light Ls exiting from the first lens 2 of the vehicle lamp 100 can be suppressed from spreading in the first direction X. Because the irradiation light Ls exiting from the second portion 22 is suppressed from spreading in the first direction X, the vehicle lamp 100 can increase the luminous intensity of the irradiation light Ls exiting from the first lens 2. As described above, the vehicle lamp 100 can emit light having a large light distribution angle in the second direction Y and high luminous intensity and satisfying the regulations and standards regarding irradiation regions of vehicle lamps. Further, the second portion 22 is a cylindrical body. Thus, as compared to when the second portion 22 has a refractive power in the first direction X and the second direction Y, the second portion 22 can be easily formed, and thus the first lens 2 and the vehicle lamp 100 can be easily manufactured.

In the example illustrated in FIG. 2 and FIG. 4, the second portion 22 of the first lens 2 of the vehicle lamp 100 includes a portion 220 located below an optical axis 2*c* of the first lens 2 in the second direction Y. In the vehicle lamp 100, because the second portion 22 includes the portion 220, light can be spread in a direction lower than the optical axis 2*c* of the first lens 2 in the second direction Y, and the light distribution angle of the vehicle lamp 100 can be increased.

In the example illustrated in FIG. 2 and FIG. 4, the first portion 21 of the first lens 2 of the vehicle lamp 100 is located below the optical axis 2*c* of the first lens 2 in the second direction Y. This configuration allows the irradiation light Ls transmitted through the first portion 21 to be less likely to spread downward in the second direction Y. The irradiation light Ls transmitted through the first portion 21 substantially does not spread in the first direction X and the second direction Y and is thus bright as compared to the irradiation light Ls transmitted through the second portion 22. Therefore, for example, if the irradiation light Ls transmitted through the first portion 21 spreads downward in the second direction Y, there would be a possibility that the driver of an oncoming vehicle or a preceding vehicle is dazzled by reflected light of the irradiation light Ls reflected on the road surface. In the vehicle lamp 100, the irradiation light Ls transmitted through the first portion 21 is less likely to spread downward in the second direction Y, and thus reflected light of the irradiation light Ls reflected on the road surface can be reduced, and the possibility that the driver of an oncoming vehicle or a preceding vehicle is dazzled by the reflected light on the road surface can be reduced.

In the example illustrated in FIG. 1 and FIG. 4, the reflective surface 31 of the reflector 3 is a cylindrical surface having a curvature in the second direction Y and having no curvature in the first direction X. Because the reflective surface 31 of the reflector 3 has a curvature in the second direction Y, in the vehicle lamp 100, the light L incident on the second portion 22 of the first lens 2 can be further spread in the second direction Y, and the light distribution angle in the second direction Y of the irradiation light Ls exiting from the first lens 2 can be further increased. Further, a function to increase the light distribution angle in the second direction Y of the irradiation light Ls can be distributed between the first lens 2 and the reflector 3, and thus loads on a deflection function, an aberration reduction function, or the like of the first lens 2 can be reduced, thereby facilitating the design and manufacturing of the first lens 2.

Each component of the vehicle lamp 100 will be described in detail below.

(Light Source 1)

Figure 5:
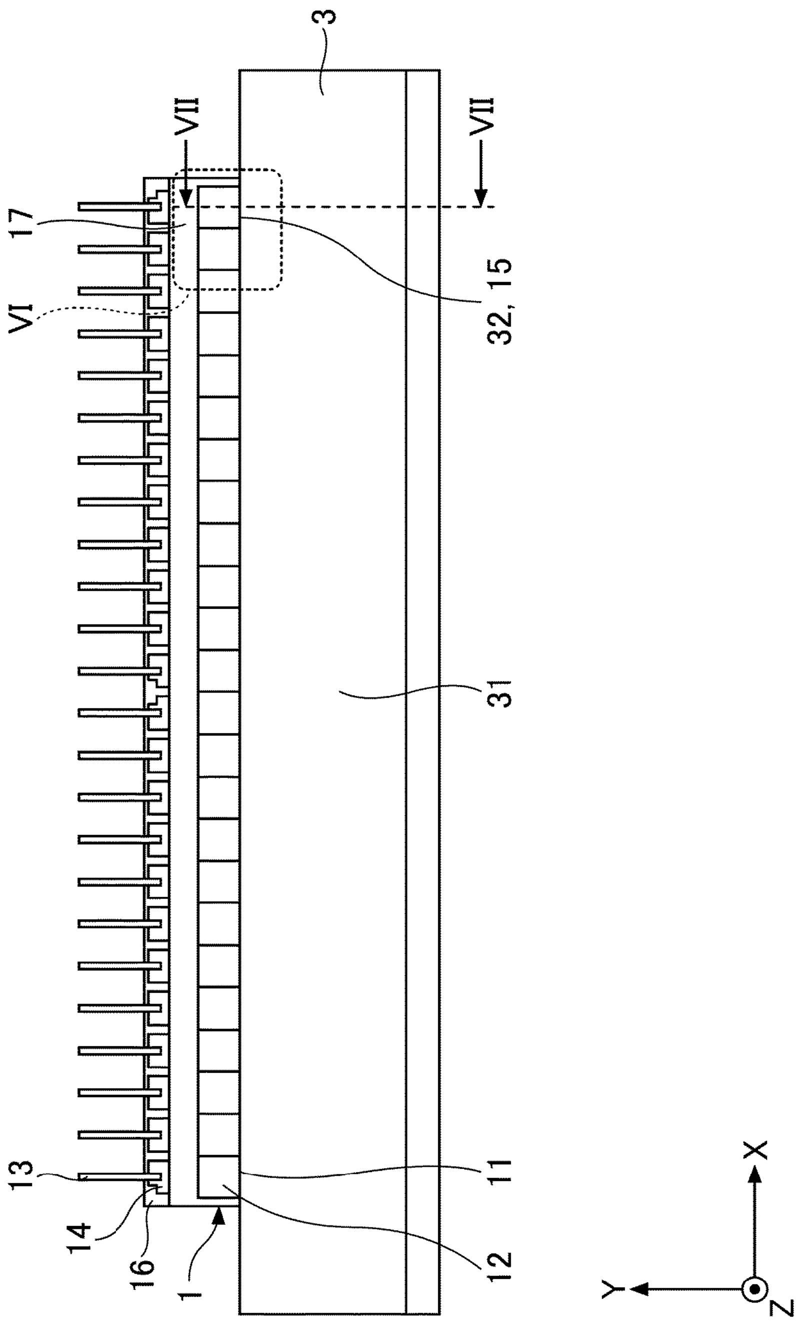
FIG. 5 is a schematic front view illustrating a configuration in the vicinity of a light source of the vehicle lamp according to the first embodiment.
Figure 6:
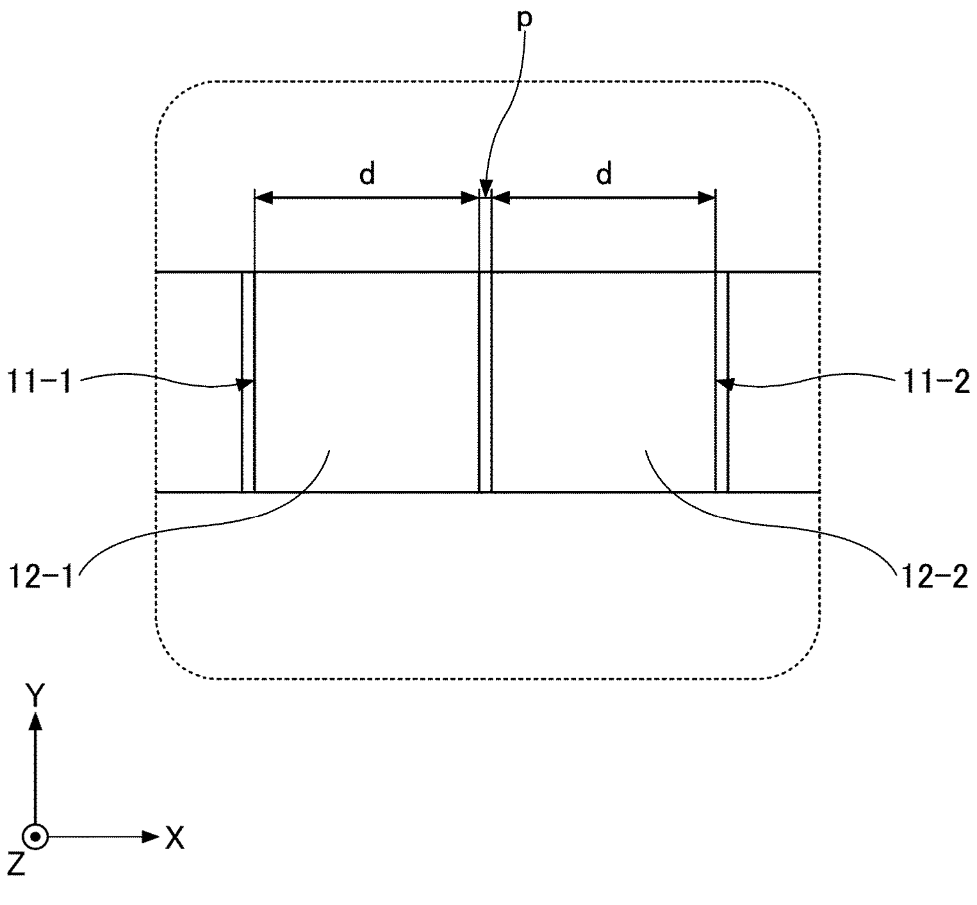
FIG. 6 is a schematic enlarged view of a region VI of FIG. 5.
Figure 7:
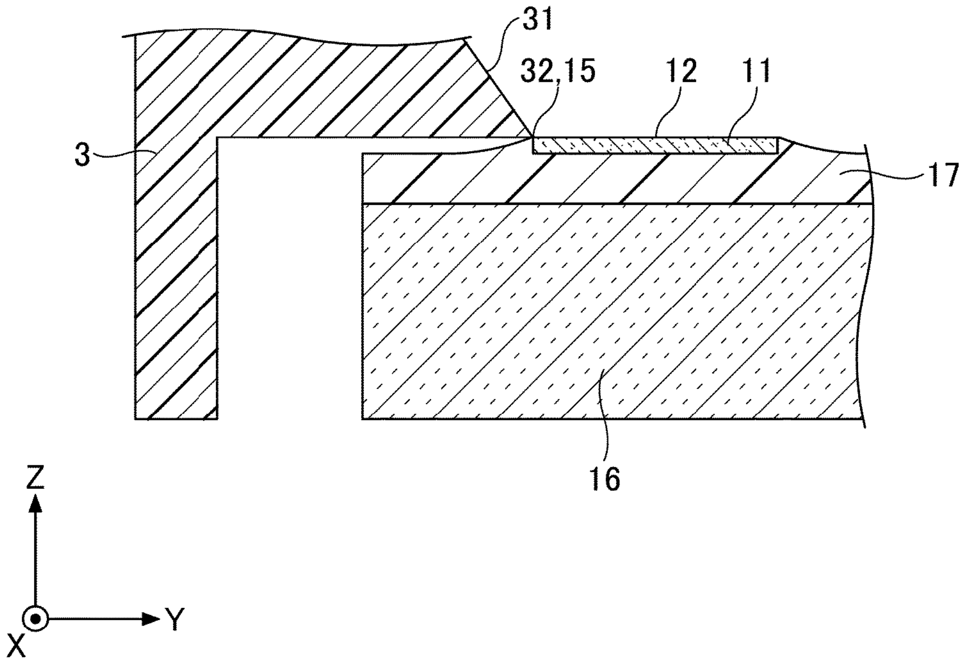
FIG. 7 is a schematic cross-sectional view taken through line VII-VII of FIG. 5.

The light source 1 will be described with reference to FIG. 5 to FIG. 7. FIG. 5 is a schematic front view illustrating an example of a configuration in the vicinity of the light source 1 of the vehicle lamp 100 according to the first embodiment. FIG. 6 is a schematic enlarged view of a region VI of FIG. 5. FIG. 7 is a schematic cross-sectional view taken through line VII-VII of FIG. 5.

The light source 1 illustrated in FIG. 5 to FIG. 7 is, for example, an LED. As illustrated in FIG. 5 and FIG. 7, the light source 1 includes a package 16, a resin member 17, and the plurality of light-emitting parts 11 arranged in the first direction X. The plurality of light-emitting parts 11 each have a light-emitting surface 12. The plurality of light-emitting parts 11 can emit light from the each light-emitting surface 12.

The package 16 is, for example, a wiring substrate in which wiring connected to the light-emitting parts 11 is provided in a base formed of a sintered body of aluminum nitride, silicon carbide, or the like. The package 16 may be a wiring substrate in which an insulating layer is formed on the surface of a metal and a wiring pattern is further provided. The metal is copper, aluminum, or the like. The resin member 17 is disposed to surround the light-emitting parts 11. It is preferable for the resin member 17 to have a light shielding property and light reflectivity. As a resin constituting the resin member 17, a thermosetting resin, a thermoplastic resin, or the like can be used. Specifically, examples of the resin member 17 include a resin containing particles of a light-reflective substance.

Each of the light-emitting parts 11 includes a light-emitting element, a wavelength conversion member, and the like, and is configured to emit light L of a desired color. The light-emitting element is, for example, a semiconductor light-emitting element. A semiconductor light-emitting element including a nitride semiconductor can be used as a light-emitting element that emits blue light, a light-emitting element that emits green light, or a light-emitting element that emits ultraviolet light. As the nitride semiconductor, for example, a GaN-based semiconductor such as GaN, InGaN, or AlGaN can be used. As a LED that emits red light, an InAlGaP-based semiconductor, a GaInP-based semiconductor, or a GaAs-based semiconductor such as GaAs or AlGaAs can be used. In a case where the vehicle lamp 100 is used as a headlight, the light-emitting parts 11 can emit white light by using semiconductor light-emitting elements that emit blue light and wavelength conversion members that convert the wavelength of blue light into the wavelength of yellow light.

The plurality of light-emitting parts 11 are arranged in one row in the first direction X. By arranging the plurality of light-emitting parts 11 in one row in the first direction X, the number of the light-emitting parts 11 can be reduced as compared to when a plurality of light-emitting parts 11 are arranged in a plurality of rows in the first direction X. Accordingly, in the vehicle lamp 100, the cost of the light source 1 can be reduced, and thus the cost of the vehicle lamp 100 can be reduced.

For example, when the plurality of light-emitting parts 11 are arranged in one row in the first direction X, the width of the light source 1 in the second direction Y is reduced as compared to when a plurality of light-emitting parts 11 arranged in the first direction X are arranged in a plurality of rows in the second direction Y. In such a case, as the width of the light source 1 in the second direction Y is reduced, the light distribution angle of the vehicle lamp 100 in the second direction Y would be reduced. Conversely, the vehicle lamp 100 includes the second portion 22, and thus can emit irradiation light Ls having a large light distribution angle in the second direction Y. Therefore, in the vehicle lamp 100, the cost of the vehicle lamp 100 can be reduced, and irradiation light Ls having a large light distribution angle in the second direction Y can be emitted. The plurality of light-emitting parts 11 do not have to be arranged in one row in the first direction X. The light source 1 may include a plurality of light-emitting parts 11 arranged in a plurality of rows in the first direction X.

The light source 1 illustrated in FIG. 5 includes twenty-four light-emitting parts 11. However, the number of the plurality of light emitting parts 11 of the light source 1 can be changed as appropriate according to the specifications or the like of the vehicle lamp 100.

FIG. 6 illustrates a light-emitting part 11-1 and a light-emitting part 11-2 adjacent to each other among the plurality of light-emitting parts 11. The light-emitting part 11-1 has a light-emitting surface 12-1. The light-emitting part 11-2 has a light-emitting surface 12-2. A light-emitting surface width d is a width of each of the light-emitting surface 12-1 and the light-emitting surface 12-2. A light-emitting surface interval p is an interval between light-emitting surfaces 12 of adjacent light-emitting parts 11 of the plurality of light-emitting parts 11. In the example illustrated in FIG. 6, a light-emitting surface interval p is an interval between the light-emitting surface 12-1 of the light-emitting part 11-1 and the light-emitting surface 12-2 of the light-emitting part 11-2. In the example illustrated in FIG. 6, the shape of the outer edge of each of the light-emitting surface 12-1 and the light-emitting surface 12-2 is a substantially square shape when viewed from the front. However, the shape of the outer edge of a light-emitting surface is not limited to a square shape. The light-emitting surface width d illustrated in FIG. 6 is 1.1 mm.

In the example illustrated in FIG. 6, the light emitting surface interval p is 0.05 mm or less. If the light-emitting surface interval p is wide, a region corresponding to the light-emitting surface interval p and irradiated with irradiation light Ls becomes dark on an irradiation surface orthogonal to the optical axis 2*c* of the first lens 2, and thus there would be a possibility that illuminance unevenness of the irradiation light Ls increases. In the vehicle lamp 100, by setting the light-emitting surface interval p to be 0.05 mm or less, a region corresponding to the light-emitting surface interval p and irradiated with irradiation light Ls is reduced, and thus illuminance unevenness of the irradiation light Ls can be reduced. Further, in the vehicle lamp 100, by setting the light-emitting surface interval p to be 0.05 mm or less, the size of the light source 1 can be reduced, and thus the size of the vehicle lamp 100 can be reduced.

In the example illustrated in FIG. 5, the vehicle lamp 100 includes a plurality of wires 13 provided in one-to-one correspondence with the plurality of light-emitting parts 11. The plurality of wires 13 are arranged in the same direction (for example, in the first direction) and are on a first side (a +Y-direction side) of the light emitting parts 11 in the second direction Y. The reflector 3 is disposed on a second side (a −Y-direction side) of the light emitting parts 11 in the second direction Y, opposite the first side. That is, the reflector 3 is located opposite the plurality of wires 13 with respect to the light emitting parts 11. In the example illustrated in FIG. 5, the plurality of wires 13 are disposed on the upper side of the respective light-emitting parts 11. The reflector 3 is disposed on the lower side of the light-emitting parts 11.

For example, if a plurality of wires and a reflector are arranged on the same side in the second direction Y with respect to the light-emitting parts, it would be necessary to dispose the reflector to avoid the plurality of wires, thereby requiring the light-emitting parts to be distanced from the reflector. As a result, the size of a vehicle lamp would be increased. Conversely, in the present embodiment, the plurality of wires 13 are arranged on a first side of the light-emitting parts 11 in the second direction Y, and the reflector 3 is disposed on a second side of the light-emitting parts 11 in the second direction Y, opposite the first side, thereby eliminating the need to dispose the reflector 3 to avoid the plurality of wires 13. Accordingly, the size of the vehicle lamp 100 can be reduced.

In the example illustrated in FIG. 5, a plurality of electrode pads 14 are arranged in the first direction X, and disposed on the surface of the package 16 and above the light-emitting parts 11. The plurality of electrode pads 14 are electrically connected to the respective light-emitting parts 11. One end of each of the plurality of wires 13 is electrically connected to a corresponding one of the plurality of electrode pads 14 by wire bonding, and the other end of each of the plurality of wires 13 is connected to an electrode provided on a circuit board (not illustrated). The light-emitting parts 11 are driven to emit light in response to a drive current or a driving voltage applied from the wires 13 via the electrode pads 14. The wires 13 and the electrode pads 14 may contain Al, Au, or the like.

As illustrated in FIG. 5 and FIG. 7, in the vehicle lamp 100, a first end portion 32 of the reflective surface 31 on the light-emitting part 11 side overlaps a second end portion 15 of a light-emitting surface 12 of each of the light-emitting parts 11 on the reflective surface 31 side when viewed in the third direction Z. In the example illustrated in FIG. 5 and FIG. 7, to indicate that the first end portion 32 and the second end portion 15 overlap each other, the reference numeral of the first end portion 32 and the reference numeral of the second end portion 15 are written together.

Because the first end portion 32 and the second end portion 15 overlap each other when viewed in the third direction Z, light loss caused by light L emitted from the light source 1 not being reflected by the reflective surface 31 can be reduced, and thus the light extraction efficiency of the vehicle lamp 100 can be increased. Further, the light distribution in the second direction Y of irradiation light Ls exiting from the first lens 2 can be controlled based on a position at which the first end portion 32 and the second end portion 15 overlap each other. Accordingly, the vehicle lamp 100 can improve controllability of the light distribution of irradiation light Ls in the second direction Y.

The light source 1 does not have to have a configuration in which one package 16 includes a plurality of light-emitting parts 11. For example, the light source 1 may have a configuration in which a plurality of packages 16 each including one light-emitting part 11 are arranged.

(First Lens 2)

In the example illustrated in FIG. 2, the shape of the outer edge of the first lens 2 when viewed from the front is a shape obtained by cutting off an arc-shaped upper portion and an arc-shaped lower portion from a substantially circular shape. However, the shape of the outer edge of the first lens 2 when viewed from the front may be a substantially rectangular shape, a substantially circular shape, a substantially elliptical shape, a substantially polygonal shape, or the like.

A front surface 211 of the first portion 21 of the first lens 2 illustrated in FIG. 1 to FIG. 4 has an aspherical shape that is convex forward. A rear surface 212 of the first portion 21 has an aspherical shape that is convex rearward. At least the curvature of the front surface 211 and the curvature of the rear surface 212 of the first portion 21 are different from each other. However, as long as the first portion 21 has a positive refractive power in the first direction X and the second direction Y, each of the front surface 211 and the rear surface 212 of the first portion 21 is not limited to an aspherical surface, and may be a spherical surface, a Fresnel lens surface, a diffractive lens surface, or the like. The front surface 211 and the rear surface 212 of the first portion 21 may have substantially the same shape.

A front surface 221 of the second portion 22 of the first lens 2 illustrated in FIG. 1 to FIG. 4 is a cylindrical surface that is convex forward along the first direction X. Further, a rear surface 222 of the second portion 22 is a cylindrical surface that is convex rearward along the first direction X. At least the curvature of the cylindrical front surface 221 and the curvature of the cylindrical rear surface 222 of the second portion 22 are different from each other. However, as long as the refractive power of the second portion 22 in the second direction Y is smaller than the refractive power of the second portion 22 in the first direction X, each of the front surface 221 and the rear surface 222 of the second portion 22 is not limited to a cylindrical surface, and may be an aspherical surface, a spherical surface, a Fresnel lens surface, a diffractive lens surface, or the like. The front surface 221 and the rear surface 222 of the second portion 22 may have substantially the same shape.

The first lens 2 includes a light-transmissive glass material or resin material. As the resin material, an acrylic resin, a polycarbonate resin, or the like can be used. The first lens 2 can be manufactured by an injection molding method or the like using a resin material or a glass material.

Figure 8:
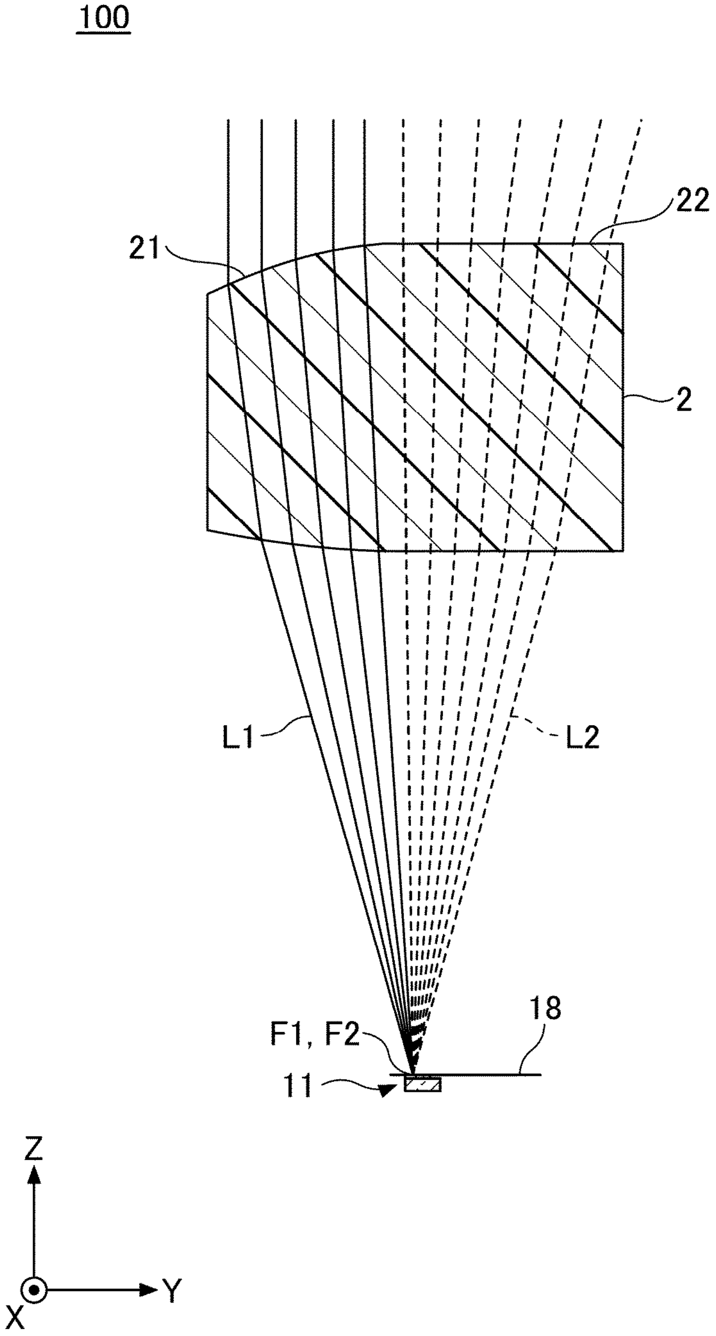
FIG. 8 is a schematic side view of a first lens and the light source, which illustrates a positional relationship between focal points of a first portion and a second portion of the first lens and light-emitting parts of the light source in the vehicle lamp according to the first embodiment.
Figure 9:
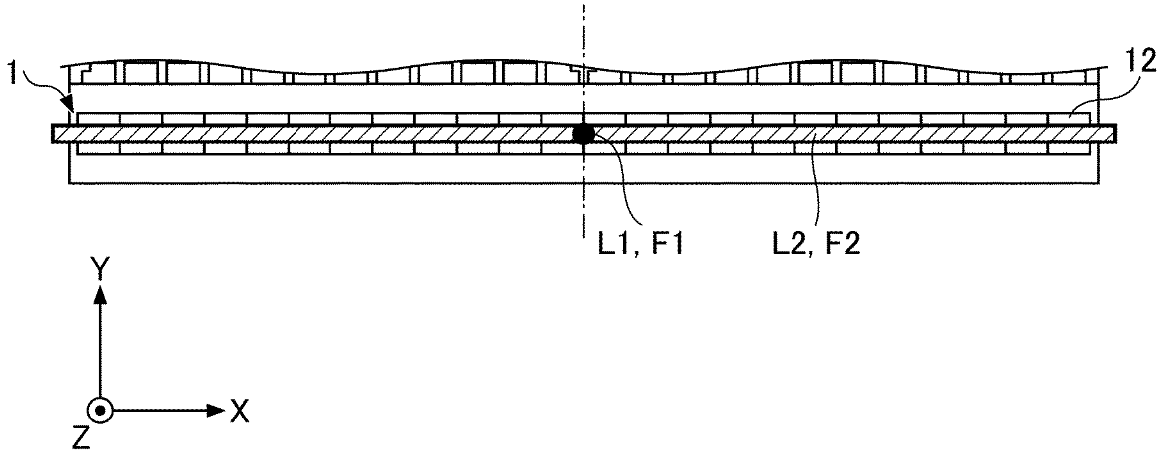
FIG. 9 is a schematic front view of the light source, which illustrates a positional relationship between the focal points of the first portion and the second portion of the first lens and light-emitting surfaces of the light source in the vehicle lamp according to the first embodiment.

FIG. 8 is a schematic side view of the first lens 2 and the light source 1, which illustrates an example of a positional relationship between focal points of the first portion 21 and the second portion 22 of the first lens 2 and the light-emitting parts 11 of the light source 1 in the vehicle lamp 100 according to the first embodiment. FIG. 9 is a schematic front view of the light source 1, which illustrates an example of a positional relationship between the focal points of the first portion 21 and the second portion 22 of the first lens 2 and the light-emitting surfaces 12 of the light source 1 in the vehicle lamp 100 according to the first embodiment. In the example illustrated in FIG. 8, some portions of light emitted from the light source 1 are represented as light beams L1 indicated by solid lines, and some portions of light emitted from the light source 1 are represented as light beams L2 indicated by dashed lines.

In the vehicle lamp 100, a focal point F1 of the first portion 21 of the first lens 2 and a focal point F2 of the second portion 22 of the first lens 2 are located on an imaginary plane 18 including the light-emitting surfaces 12 of the light-emitting parts 11, and coincide with each other when viewed in the third direction Z.

In the example illustrated in FIG. 8, the light beams L1 indicated by the solid lines are parallel light beams incident on the first portion 21 and are focused at a focal point F1 of the first portion 21. The light beams L2 indicated by the dashed lines are parallel light beams incident on the second portion 22 and are focused at focal points F2 of the second portion 22. Because the second portion 22 is a cylindrical body having a refractive power only in the first direction X, the light beams L2 are focused only in the first direction X and form a linear shape expanding in the first direction X. In the example illustrated in FIG. 8, the position of the focal point F1 and the positions of the focal points F2 in the third direction Z are substantially the same, and the focal point F1 and the focal points F2 are located on the imaginary plane 18. Further, as illustrated in FIG. 9, the light beams L1 are focused at the focal point F1 so as to form a point-like shape when viewed from the front. The light beams L2 are focused at the focal points F2 so as to form a linear shape in which the focal points F2 are continuous in the first direction X. In the example illustrated in FIG. 9, the focal point F1 and any of the focal points F2 coincide with each other.

In the vehicle lamp 100, the focal point F1 and the focal points F2 are located on the imaginary plane 18, and the focal point F1 and any of the focal points F2 coincide with each other when viewed in the third direction Z. Thus, the light distribution of the vehicle lamp 100 can be controlled based on a position at which the focal point F1 and any of the focal points F2 coincide with each other. Accordingly, the controllability of the light distribution of the vehicle lamp 100 can be improved. In addition, stray light can be suppressed, and irradiation light Ls having substantially no illuminance unevenness can be emitted.

(Reflector 3)

The reflector 3 is produced by, for example, providing a metal film such as aluminum on the surface of a base including a resin material. However, the reflector 3 is not limited thereto, and the reflector 3 can be produced by, for example, cutting and polishing a metal material.

Figure 10:
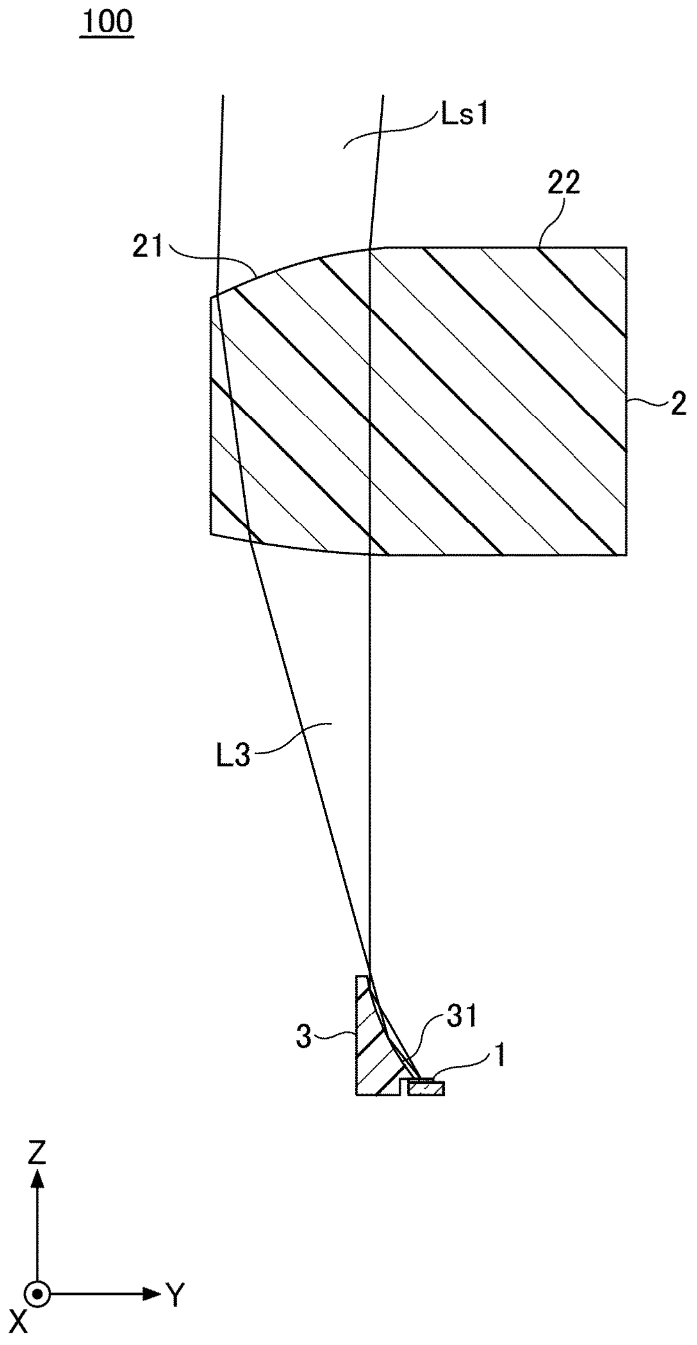
FIG. 10 is a schematic side view of the vehicle lamp according to the first embodiment, which illustrates light reflected by a reflector of the vehicle lamp and subsequently transmitted through the first portion of the first lens.
Figure 11:
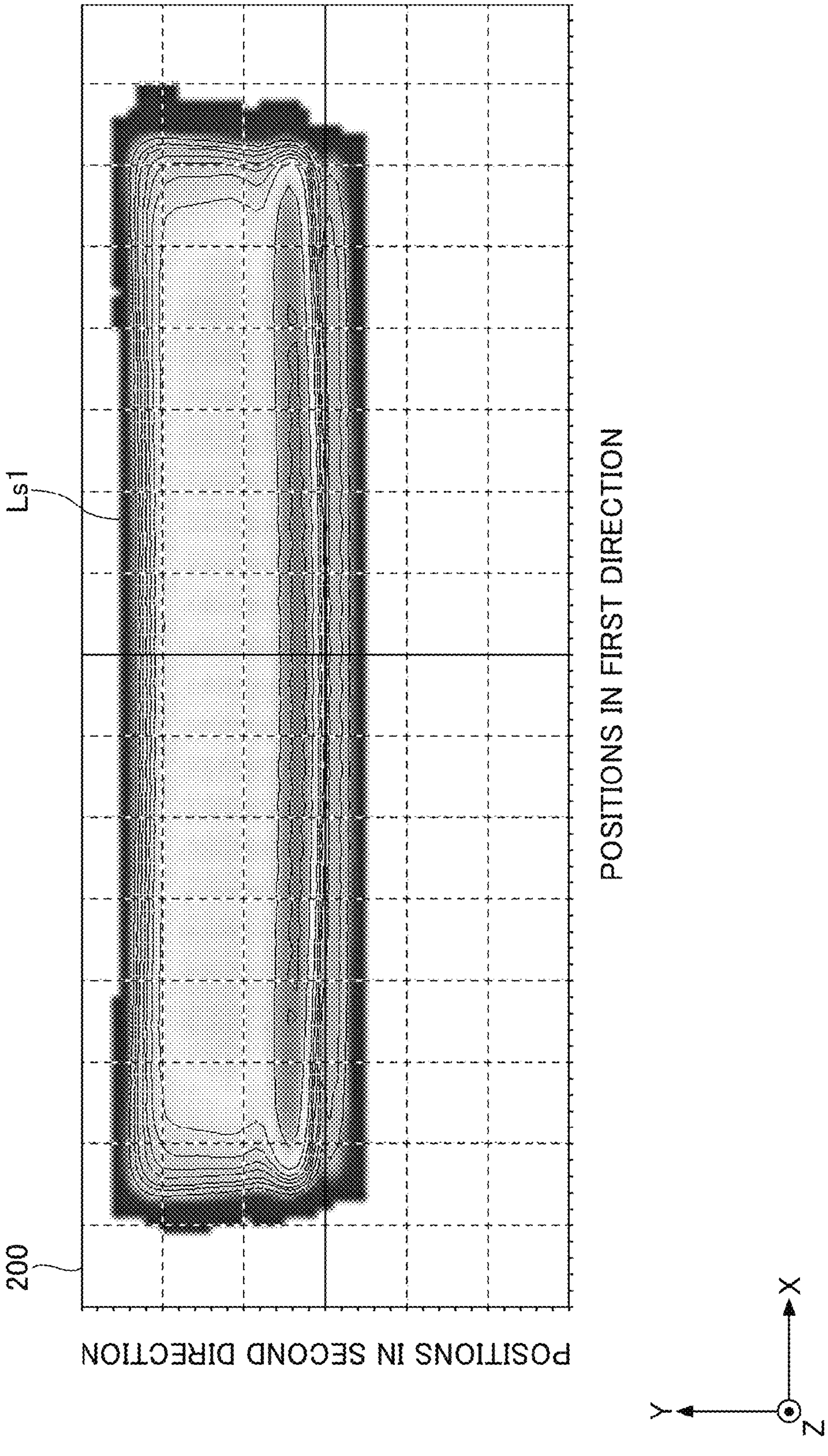
FIG. 11 is a schematic front view illustrating first irradiation light transmitted through and exiting from the first portion of the first lens of the vehicle lamp according to the first embodiment.
Figure 12:
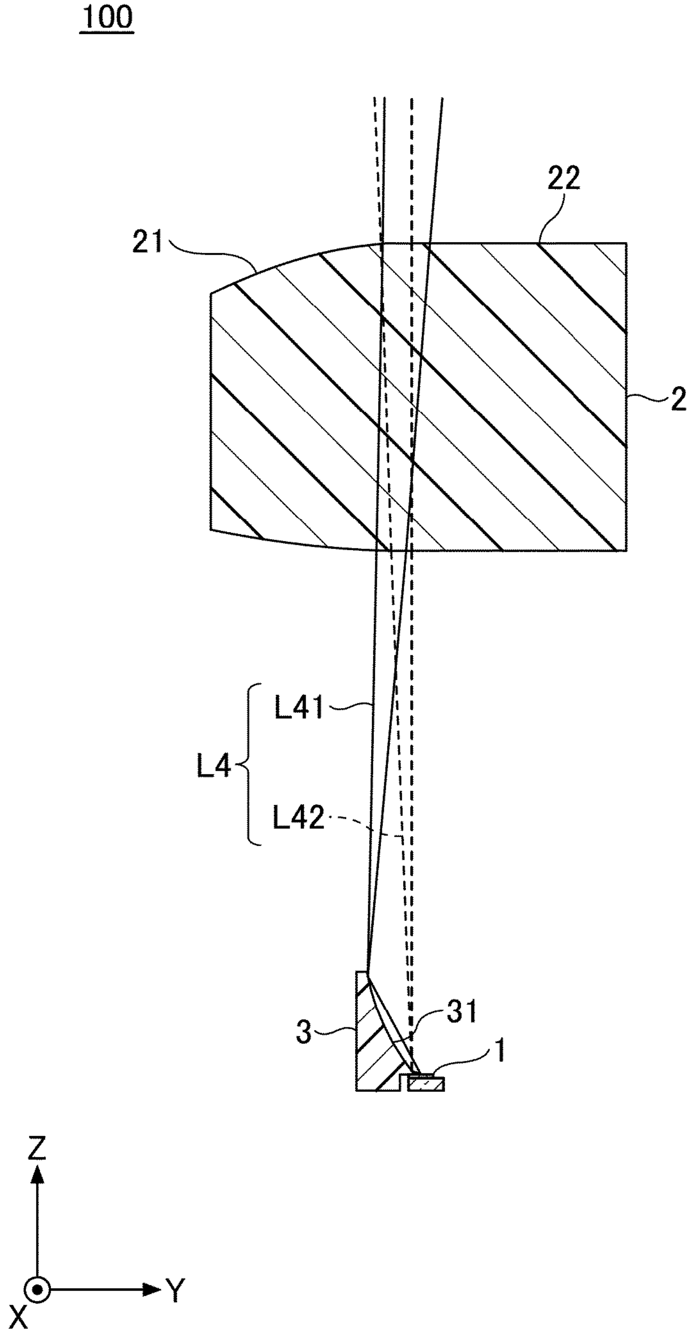
FIG. 12 is a schematic side view of the vehicle lamp according to the first embodiment, which illustrates light reflected by the reflector of the vehicle lamp and subsequently transmitted through the second portion of the first lens.
Figure 13:
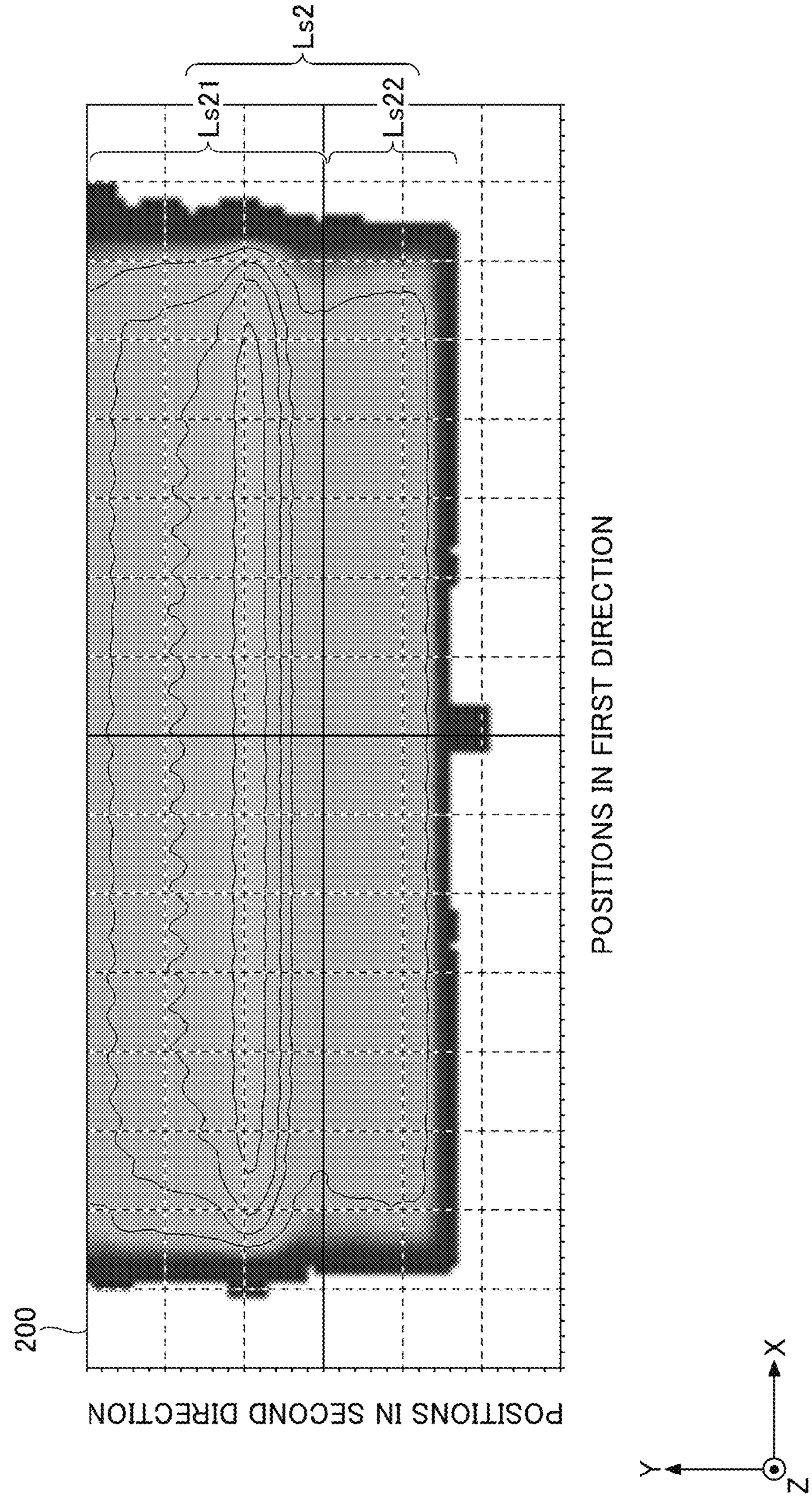
FIG. 13 is a schematic front view illustrating second irradiation light transmitted through and exiting from the second portion of the first lens of the vehicle lamp according to the first embodiment.

Functions of the reflector 3 will be described with reference to FIG. 10 to FIG. 13. FIG. 10 is a schematic side view of the vehicle lamp 100 according to the first embodiment, which illustrates an example of light L3 reflected by the reflector 3 of the vehicle lamp 100, and subsequently transmitted through the first portion 21 of the first lens 2. FIG. 11 is a schematic front view illustrating an example of first irradiation light Ls1 reflected by the reflector 3, subsequently transmitted through, and exiting from the first portion 21 of the first lens 2 of the vehicle lamp 100 according to the first embodiment. FIG. 12 is a schematic side view of the vehicle lamp 100 according to the first embodiment, which illustrates an example of light L4 reflected by the reflector 3 of the vehicle lamp 100, and subsequently transmitted through the second portion 22 of the first lens 2. FIG. 13 is a schematic front view illustrating an example of second irradiation light Ls2 reflected by the reflector 3 of the vehicle lamp according to the first embodiment, and subsequently transmitted through, and exiting from the second portion 22 of the first lens 2.

In the example illustrated in FIG. 10, a portion of light emitted from the light source 1 is represented as the light L3 indicated by a solid line. In the example illustrated in FIG. 12, a portion of light emitted from the light source 1 is represented as light L41 indicated by a solid line, and a portion of light emitted from the light source 1 is represented as light L42 indicated by a dashed line. FIG. 11 is an image diagram of the first irradiation light Ls1 calculated by a simulation. FIG. 13 is an image diagram of the second irradiation light Ls2 calculated by a simulation.

In FIG. 10, the light L3 reflected by the reflective surface 31 of the reflector 3, of the light L emitted from the light source 1, is incident on the first portion 21 of the first lens 2, is transmitted through the first portion 21, and is then emitted, as the first irradiation light Ls1, to an irradiation surface.

As illustrated in FIG. 11, the first irradiation light Ls1 is emitted to the upper side of an irradiation surface 200. The density of the first irradiation light Ls1 in FIG. 11 represents the luminous intensity. The higher the density in FIG. 11, the higher the luminous intensity. The same applies to schematic front views of irradiation light to be described later.

In FIG. 12, the light L41 reflected by a front region of the reflective surface 31 of the reflector 3, of the light L emitted from the light source 1, is spread upward by the reflection on the reflective surface 31. The light L41 is incident on the second portion 22 of the first lens 2, transmitted through the second portion 22, and is then emitted, as second irradiation light Ls21, to the irradiation surface. As illustrated in FIG. 13, the second irradiation light Ls21 is emitted to the upper side of the irradiation surface 200.

In FIG. 12, the light L42 reflected by a rear region of the reflective surface 31 of the reflector 3, of the light L emitted from the light source 1, is spread downward by the reflection on the reflective surface 31. The light L42 is incident on the second portion 22 of the first lens 2, transmitted through the second portion 22, and is then emitted, as second irradiation light Ls22, to the irradiation surface. As illustrated in FIG. 13, the second irradiation light Ls22 is emitted to the lower side of the irradiation surface 200.

Irradiation Light from Vehicle Lamp According to First Embodiment

Figure 14:
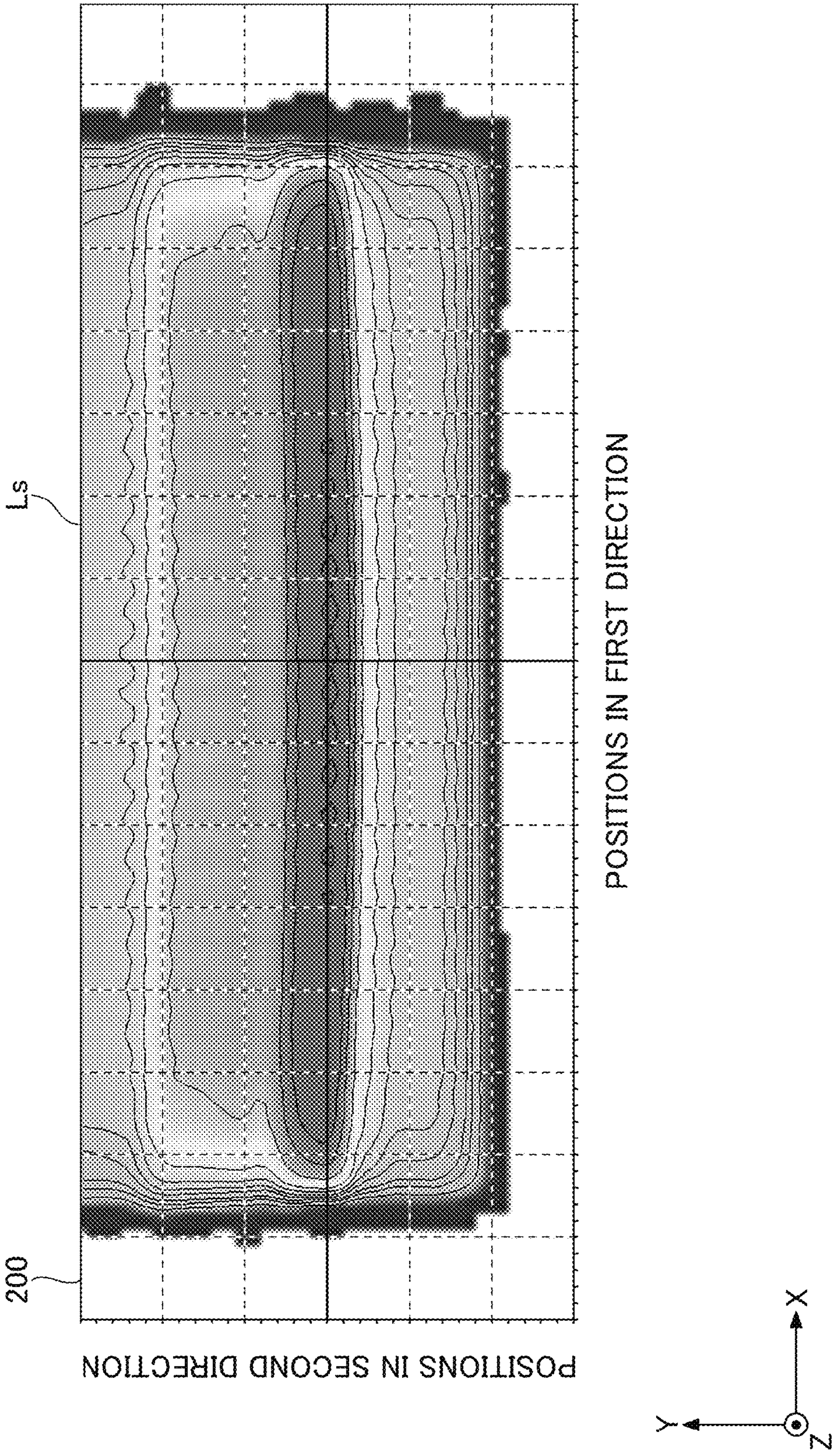
FIG. 14 is a schematic front view illustrating a first example of irradiation light from the vehicle lamp according to the first embodiment.
Figure 15:
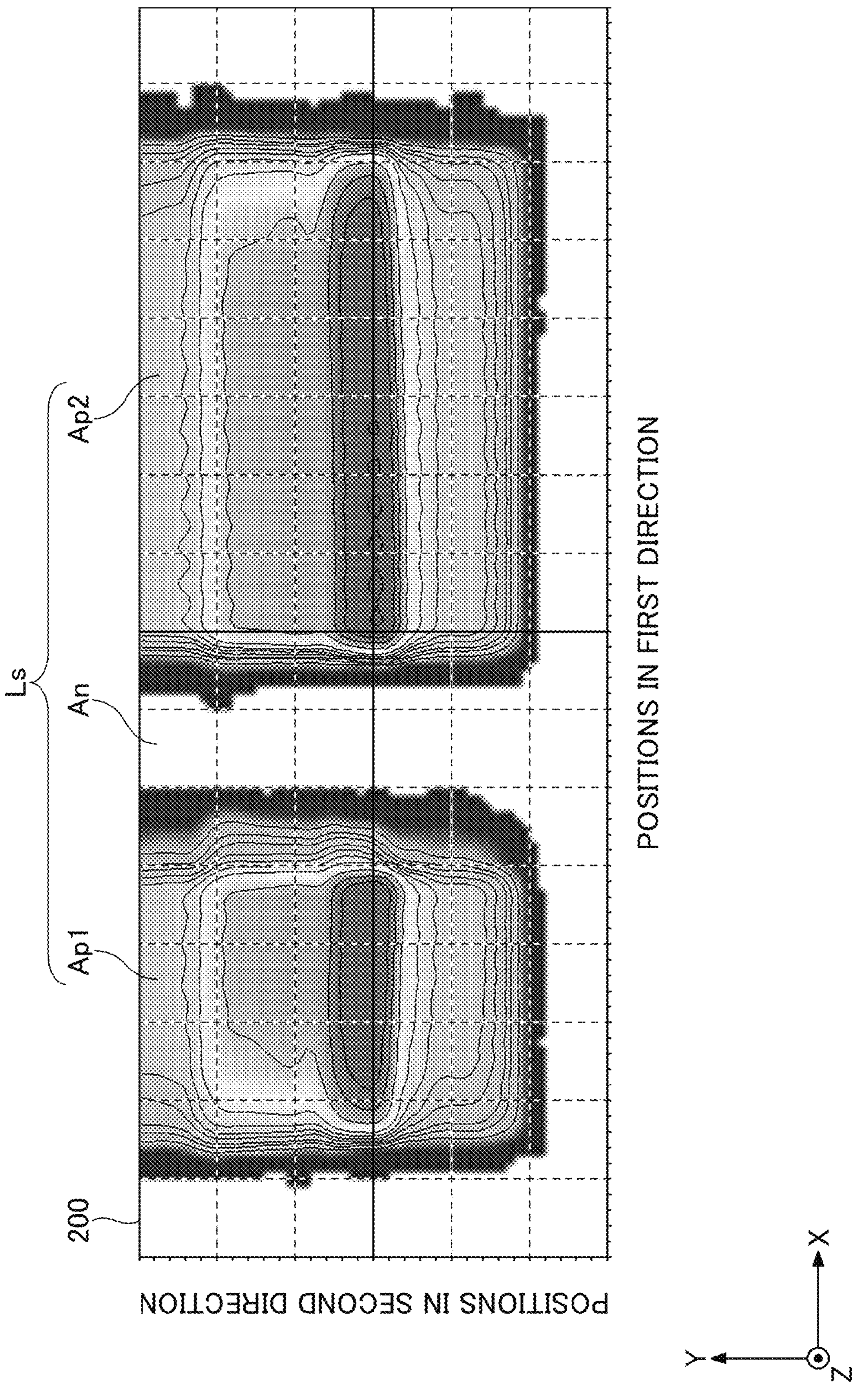
FIG. 15 is a schematic front view illustrating a second example of irradiation light from the vehicle lamp according to the first embodiment.
Figure 16:
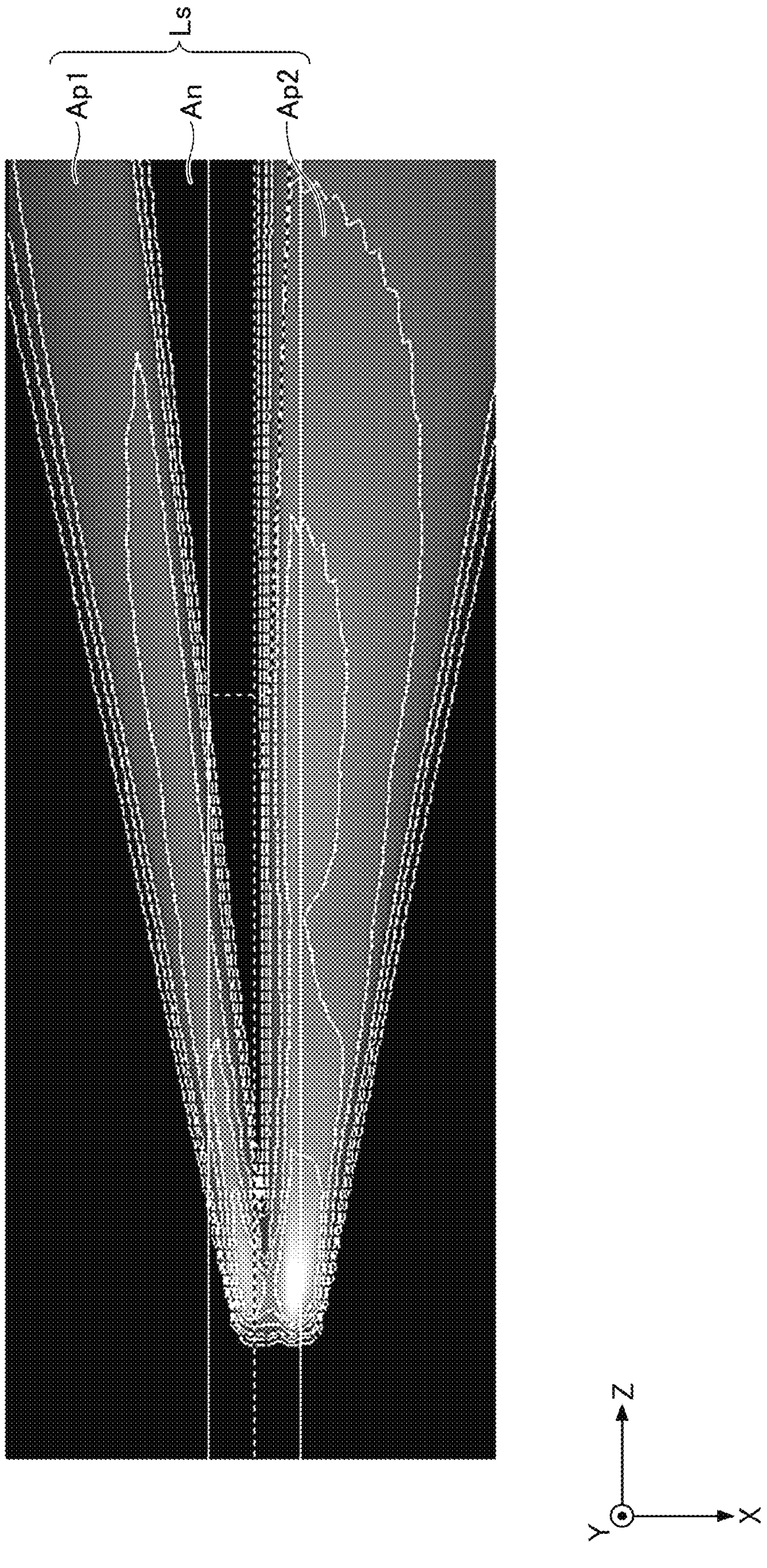
FIG. 16 is a schematic top view illustrating the second example of the irradiation light from the vehicle lamp according to the first embodiment.

Irradiation light from the vehicle lamp 100 according to the first embodiment will be described with reference to FIG. 14 and FIG. 15. FIG. 14 is a schematic front view illustrating a first example of irradiation light Ls from the vehicle lamp 100 according to the first embodiment. FIG. 14 is an image diagram of the irradiation light Ls calculated by a simulation. Further, the irradiation light Ls illustrated in FIG. 14 is obtained by combining the first irradiation light Ls1 of FIG. 11 and the second irradiation light Ls2 of FIG. 13. FIG. 15 is a schematic front view illustrating a second example of irradiation light Ls from the vehicle lamp 100 according to the first embodiment. FIG. 16 is a schematic top view illustrating the second example of the irradiation light Ls from the vehicle lamp 100 according to the first embodiment.

As illustrated in FIG. 14, the vehicle lamp 100 can irradiate the irradiation surface 200 with the irradiation light Ls having a large light distribution angle in the second direction Y and high luminous intensity.

(ADB Function)

In the vehicle lamp 100, the plurality of light-emitting parts 11 of the light source 1 are controllable to be individually turned on or off. The vehicle lamp 100 can implement an adaptive driving beam (ADB) function by controlling the plurality of light-emitting parts 11 to be individually turned on or off. The ADB function is a function to reduce glare to the driver of a preceding vehicle or an oncoming vehicle traveling in front of a vehicle on which the vehicle lamp 100 is mounted or pedestrians or the like located around the vehicle on which the vehicle lamp 100 is mounted, by causing a portion of irradiation light from the vehicle lamp 100 not to be emitted. For example, by using the ADB function, the vehicle lamp 100 turns off light-emitting parts 11 that irradiate the driver of a preceding vehicle and/or an oncoming vehicle, pedestrians, or the like. Accordingly, the amount of light emitted to the driver of an oncoming vehicle or a preceding vehicle, or pedestrians can be reduced, and thus the driver or the pedestrians are less likely to be dazzled.

In FIG. 15 and FIG. 16, the irradiation light Ls includes a first turned-on region Ap1, a second turned-on region Ap2, and a turned-off region An. The first turned-on region Ap1 and the second turned-on region Ap2 are regions partially irradiated with light on the irradiation surface 200 by turning on some of the plurality of light-emitting parts 11. The turned-off region An located between the first turned-on region Ap1 and the second turned-on region Ap2 is a region not irradiated with light on the irradiation surface 200 by turning off at least one of the plurality of light-emitting parts 11. By using the ADB function, the vehicle lamp 100 can suppress the driver of an oncoming vehicle and/or a preceding vehicle from being irradiated with light by turning off light-emitting part(s) 11 corresponding to the position of the driver.

Second Embodiment

Next, a vehicle lamp according to a second embodiment will be described. The same names and reference numerals as those in the above-described embodiment denote the same or similar members or configurations, and a detailed description thereof will be omitted as appropriate. The same applies to embodiments to be described later.

Overall Configuration of Vehicle Lamp According to Second Embodiment

Figure 17:
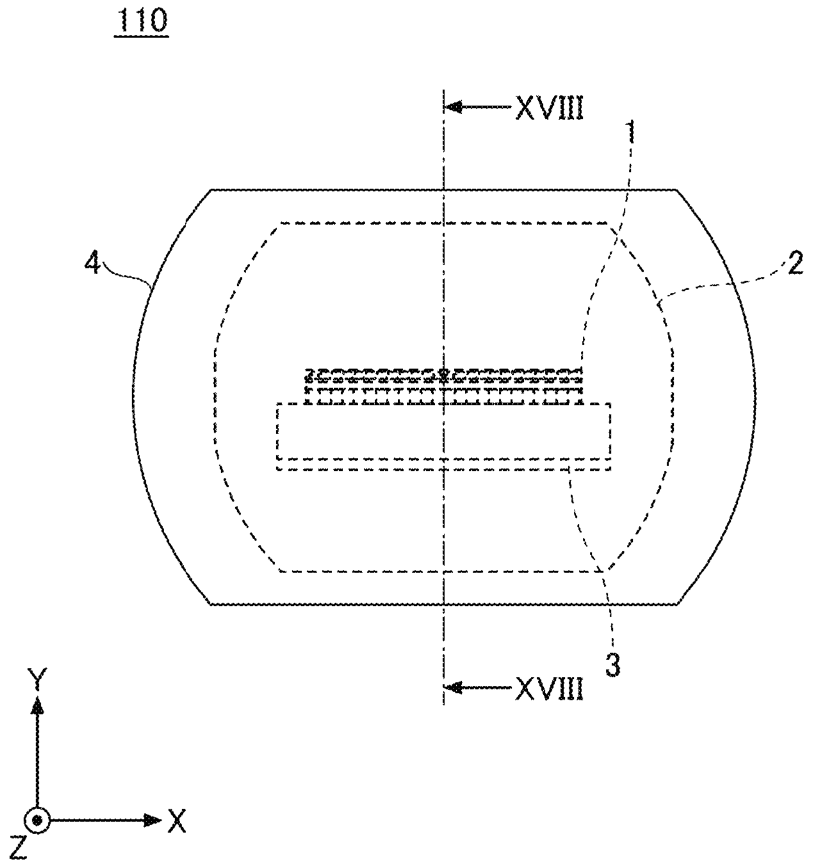
FIG. 17 is a schematic front view illustrating an overall configuration of a vehicle lamp according to a second embodiment.
Figure 18:
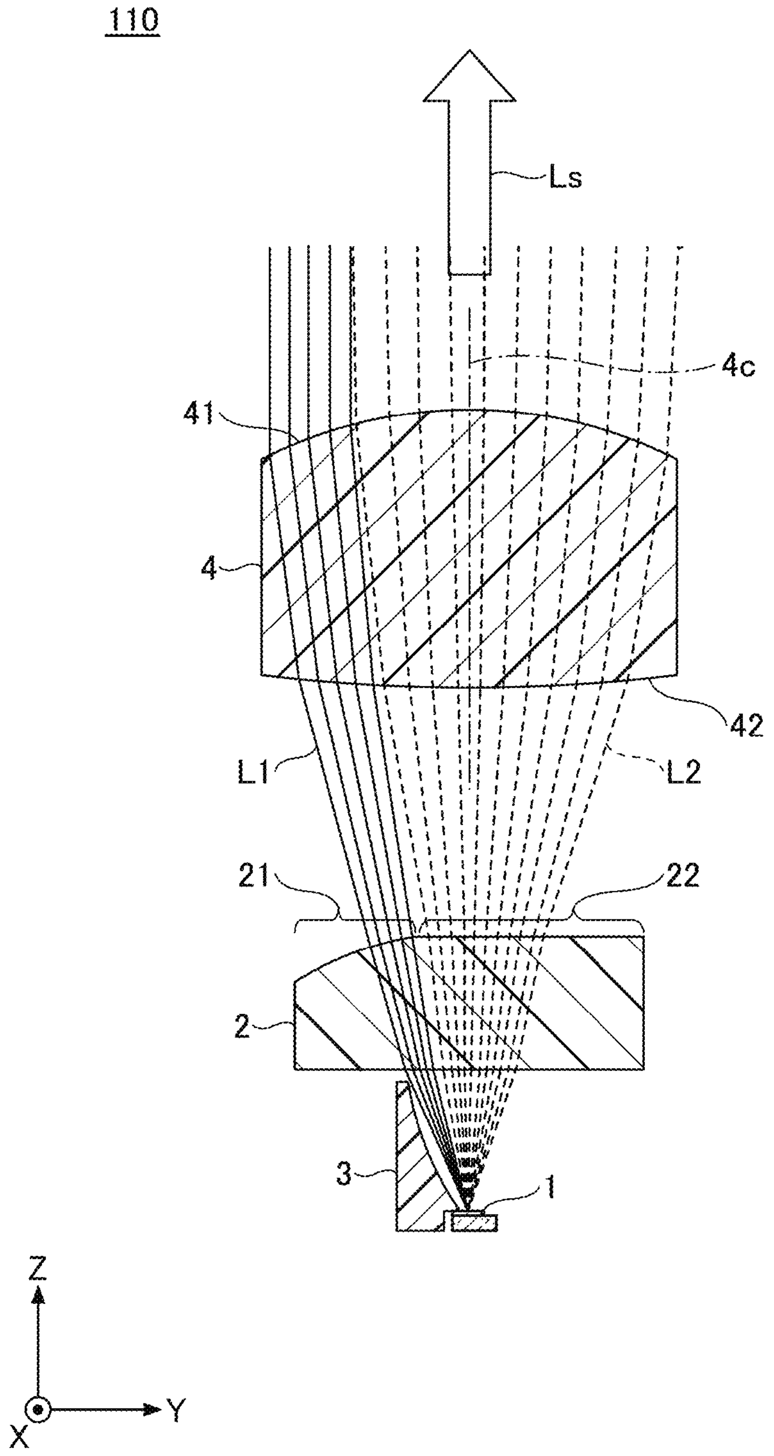
FIG. 18 is a cross-sectional view taken through line XVIII-XVIII of FIG. 17.
Figure 19:
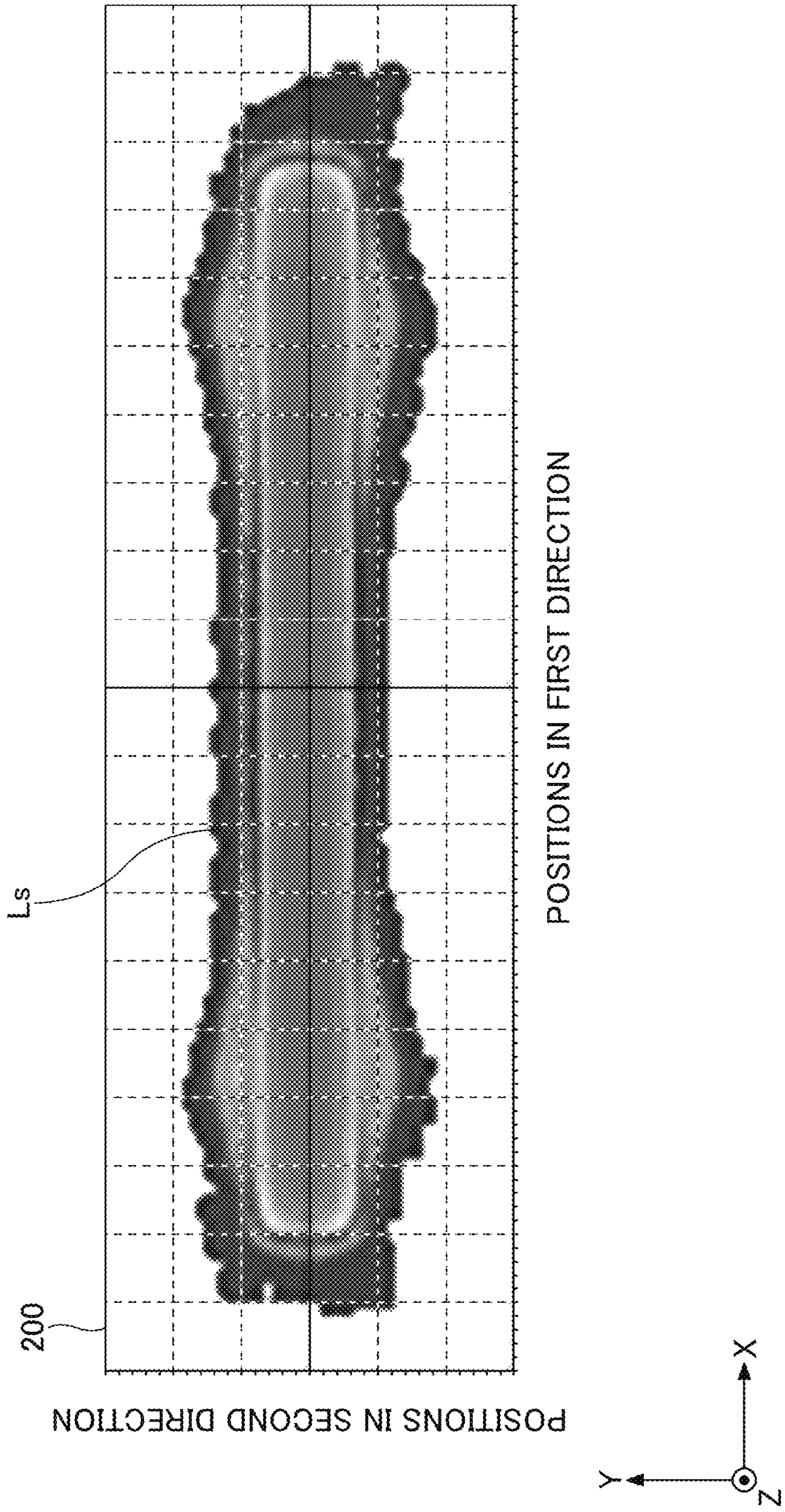
FIG. 19 is a schematic front view illustrating a first example of irradiation light from the vehicle lamp according to the second embodiment.
Figure 20:
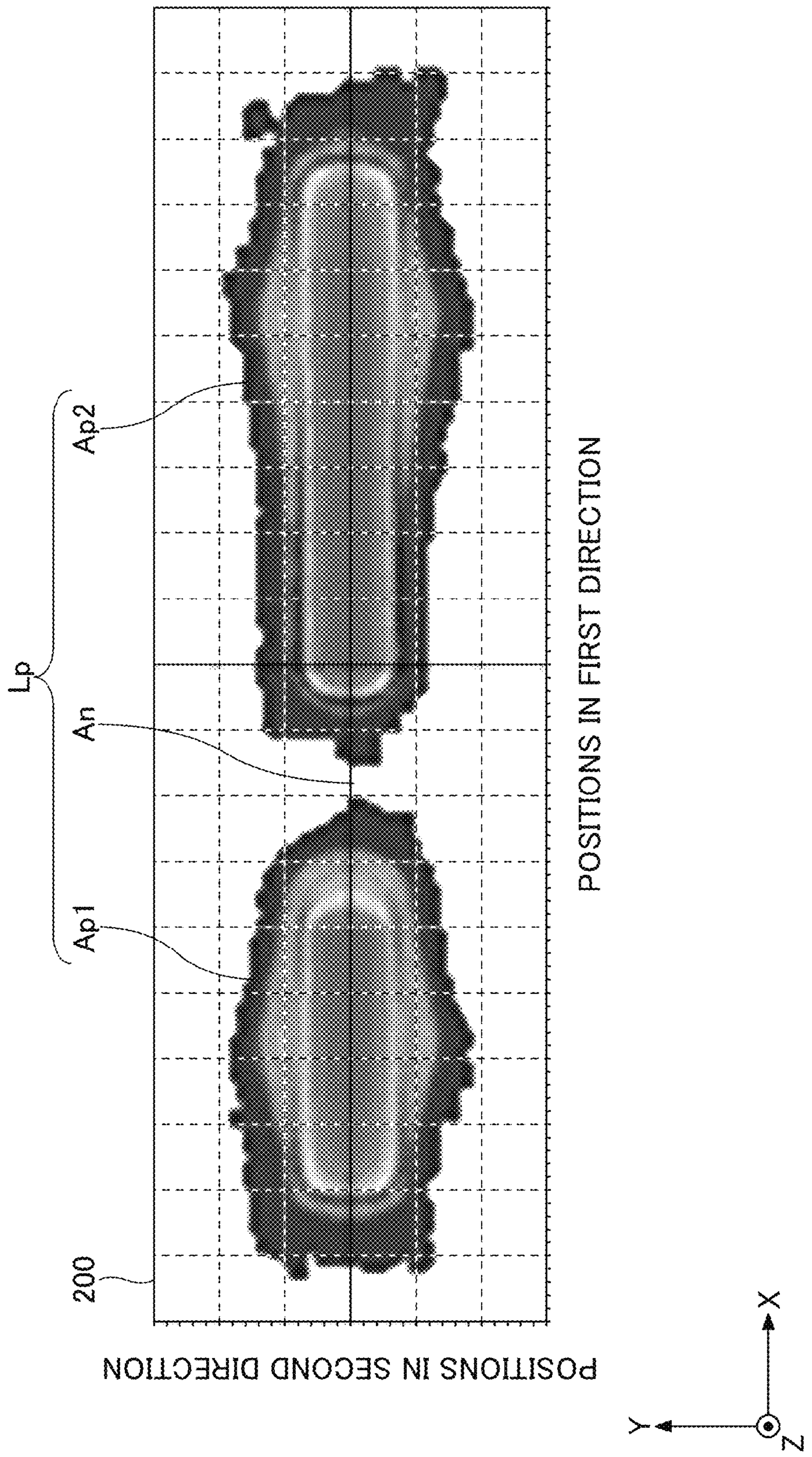
FIG. 20 is a schematic front view illustrating a second example of irradiation light from the vehicle lamp according to the second embodiment.

A configuration of the vehicle lamp according to the second embodiment will be described with reference to FIG. 17 and FIG. 18. FIG. 17 is a schematic front view illustrating an example of an overall configuration of a vehicle lamp 110 according to the second embodiment. FIG. 18 is a schematic cross-sectional view taken through line XVIII-XVIII of FIG. 17. FIG. 19 is a schematic front view illustrating an example of irradiation light Ls from the vehicle lamp 110 according to the second embodiment. FIG. 20 is a schematic front view illustrating an example of irradiation light Ls from the vehicle lamp 110 according to the second embodiment. In the example illustrated in FIG. 18, a portion of light emitted from a light source 1 is represented as light L1 indicated by a solid line, and a portion of the light emitted from the light source 1 is represented as light L2 indicated by a dashed line. Further, in the example illustrated in FIG. 18, irradiation light from the vehicle lamp 110 is represented as irradiation light Ls indicated by a white arrow.

As illustrated in FIG. 17 and FIG. 18, the second embodiment differs from the first embodiment in that the vehicle lamp 110 includes a second lens 4 disposed in front of a first lens 2 in the third direction Z.

The second lens 4 is a lens having a surface that is substantially rotationally symmetrical about a central axis 4*c* of the second lens 4. The central axis 4*c* extends along a direction in which the second lens 4 emits light, for example, along the third direction Z. The second lens 4 includes a light-transmissive glass material or resin material. As the resin material, an acrylic resin, a polycarbonate resin, or the like can be used. The second lens 4 can be manufactured by an injection molding method or the like using a resin material or a glass material.

In the example illustrated in FIG. 17, the shape of the outer edge of the second lens 4 when viewed from the front is a shape obtained by cutting off an arc-shaped upper portion and an arc-shaped lower portion from a substantially circular shape. However, the shape of the outer edge of the second lens 4 when viewed from the front may be a substantially rectangular shape, a substantially circular shape, a substantially elliptical shape, a substantially polygonal shape, or the like.

A front surface 41 of the second lens 4 illustrated in FIG. 18 has a spherical shape that is convex forward. A rear surface 42 of the second lens 4 has a spherical shape that is convex rearward. At least the curvature of the front surface 41 and the curvature of the rear surface 42 of the second lens 4 are different from each other. However, as long as the second lens 4 has a surface that is substantially rotationally symmetrical about the central axis 4*c*, each of the front surface 41 and the rear surface 42 is not limited to a spherical surface, and may be an aspherical surface, a Fresnel lens surface, a diffractive lens surface, or the like. The front surface 41 and the rear surface 42 may have substantially the same shape.

In the example illustrated in FIG. 18, the light L1 emitted from the light source 1 is incident on a first portion 21 of the first lens 2, is transmitted through the first portion 21, and subsequently exits from the first portion 21. After exiting from the first portion 21, the light L1 is incident on the second lens 4, is transmitted through the second lens 4, and subsequently exits from the second lens 4. As a result, the light L1 is emitted, as a portion of the irradiation light Ls, from the vehicle lamp 110.

In the example illustrated in FIG. 18, the light L2 emitted from the light source 1 is incident on a second portion 22 of the first lens 2, is transmitted through the second portion 22, and subsequently exits from the second portion 22. After exiting from the second portion 22, the light L2 is incident on the second lens 4, is transmitted through the second lens 4, and subsequently exits from the second lens 4. As a result, the light L2 is emitted, as a portion of the irradiation light Ls, from the vehicle lamp 110.

Irradiation Light From Vehicle Lamp According to Second Embodiment

Irradiation light from the vehicle lamp 110 according to the second embodiment will be described with reference to FIG. 19 and FIG. 20. FIG. 19 is a schematic front view illustrating a first example of irradiation light Ls from the vehicle lamp 110 according to the second embodiment. FIG. 20 is a schematic front view illustrating a second example of irradiation light Ls from the vehicle lamp 110 according to the second embodiment. FIG. 19 and FIG. 20 are image diagrams of the irradiation light Ls obtained by simulations.

In contrast to the irradiation light Ls according to the first example illustrated in FIG. 19, the irradiation light Ls according to the second example illustrated in FIG. 20 includes a turned-off region An on the irradiation surface 200. The irradiation light Ls illustrated in FIG. 20 includes a first turned-on region Ap1 and a second turned-on region Ap2 on both sides of the turned-off region An in the first direction X. The first turned-on region Ap1 and the second turned-on region Ap2 are regions partially irradiated with light on an irradiation surface 200 by turning on some of a plurality of light-emitting parts 11. The turned-off region An located between the first turned-on region Ap1 and the second turned-on region Ap2 is a region not irradiated with light on the irradiation surface 200 by turning off some of the plurality of light-emitting parts 11.

In the present embodiment, the second lens 4 is disposed in front of the first lens 2 in the third direction Z, and thus the curvature of each lens surface of the first lens 2 and the second lens 4 can be made gentle as compared to when only the first lens 2 is included. By making the curvature of each lens surface gentle, it becomes easy to reduce lens aberrations, and it is possible to increase the contrast between a turned-on region, such as the first turned-on region Ap1 or the second turned-on region Ap2, and the turned-off region An of the irradiation light Ls. Accordingly, in the present embodiment, the amount of light emitted to the driver of an oncoming vehicle and/or a preceding vehicle, pedestrians, or the like can be reduced, and thus the driver or the pedestrians are less likely to be dazzled.

Although embodiments have been described in detail above, the above-described embodiments are non-limiting examples, and various modifications and substitutions can be made to the above-described embodiments without departing from the scope described in the claims.

The numbers such as ordinal numbers and quantities used in the description of the embodiments are provided as examples to specifically describe the techniques of the present disclosure, and the present invention is not limited to the exemplified numbers. In addition, the connection relationship between the components is illustrated for specifically describing the techniques of the present disclosure, and the connection relationship for implementing the functions of the present invention is not limited thereto.

Each of the vehicle lamps according to the present disclosure can emit light having a large light distribution angle. Thus, in particular, the vehicle lamps according to the present disclosure can be suitably used as lamps for automobiles. In the embodiments according to the present disclosure, the vehicle lamps used as headlights are provided as examples, but the present disclosure is not limited thereto. For example, the vehicle lamps can be used for various applications such as communication lamps and daytime running lamps. Further, the application of the vehicle lamps according to the present disclosure is not limited to applications in which the vehicle lamps are mounted on automobiles. The vehicle lamps according to the present disclosure can be used as lamps for aerial vehicles such as helicopters and drones.

According to an embodiment of the present disclosure, a vehicle lamp capable of emitting light having a large light distribution angle and satisfying regulations and standards regarding irradiation regions of vehicle lamps can be provided.

What is claimed is:

1. A vehicle lamp comprising:

a light source comprising a plurality of light-emitting parts arranged in a first direction;

first lens separated from the light source and configured to transmit light emitted from the light source; and a reflector disposed between the first lens and the light source, located below the plurality of light-emitting parts in a second direction orthogonal to the first direction, and having a reflective surface that reflects the light emitted from the light source, wherein:

the first lens comprises:

a first portion having a positive refractive power in each of the first direction and the second direction, and a second portion having a refractive power in the second direction that is smaller than a refractive power in the first direction, and the refractive power of the first portion in the second direction is greater than the refractive power of the second portion in the second direction.

2. The vehicle lamp according to claim 1, wherein the second portion is located above the first portion in the second direction.

3. The vehicle lamp according to claim 1, wherein the first portion is located below an optical axis of the first lens in the second direction.

4. The vehicle lamp according to claim 1, wherein the second portion comprises a portion located below an optical axis of the first lens in the second direction.

5. The vehicle lamp according to claim 1, wherein the second portion is a cylindrical body having a positive refractive power in the first direction and having substantially no refractive power in the second direction.

6. The vehicle lamp according to claim 1, wherein the reflective surface of the reflector is a cylindrical surface having a curvature in the second direction and having no curvature in the first direction.

7. The vehicle lamp according to claim 1, wherein the plurality of light-emitting parts are arranged in one row in the first direction.

8. The vehicle lamp according to claim 7, wherein an interval between light-emitting surfaces of adjacent light-emitting parts of the plurality of light-emitting parts is 0.05 mm or less.

9. The vehicle lamp according to claim 8, further comprising:

a plurality of wires provided in one-to-one correspondence with the plurality of light-emitting parts, wherein:

the plurality of wires are arranged in a same direction and are on a first side of the plurality of light-emitting parts in the second direction, and the reflector is disposed on a second side of the plurality of light-emitting parts in the second direction, opposite the first side.

10. The vehicle lamp according to claim 1, wherein the plurality of light-emitting parts are controllable to be individually turned on or off.

11. The vehicle lamp according to claim 1, wherein a first end portion on a light-emitting part side of the reflective surface overlaps a second end portion on a reflective surface side of a light-emitting surface of each of the plurality of light-emitting parts when viewed in a third direction intersecting each of the first direction and the second direction.

12. The vehicle lamp according to claim 1, wherein a focal point of the first portion and a focal point of the second portion are located on an imaginary plane including light-emitting surfaces of the plurality of the light-emitting parts, and coincide with each other when viewed in a third direction intersecting each of the first direction and the second direction.

13. The vehicle lamp according to claim 1, further comprising:

a second lens disposed in front of the first lens in a third direction intersecting each of the first direction and the second direction.

* * * * *